(12) United States Patent
Lee et al.

(10) Patent No.: US 9,369,954 B2
(45) Date of Patent: Jun. 14, 2016

(54) METHOD AND APPARATUS FOR TRANSCEIVING DATA IN RADIO ACCESS SYSTEM SUPPORTING MULTI-RADIO ACCESS TECHNOLOGY

(75) Inventors: Eunjong Lee, Gyeonggi-do (KR); Heejeong Cho, Gyeonggi-do (KR); Kiseon Ryu, Gyeonggi-do (KR); Youngsoo Yuk, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 14/008,603

(22) PCT Filed: Mar. 30, 2012

(86) PCT No.: PCT/KR2012/002427
§ 371 (c)(1),
(2), (4) Date: Sep. 30, 2013

(87) PCT Pub. No.: WO2012/134244
PCT Pub. Date: Oct. 4, 2012

(65) Prior Publication Data
US 2014/0023013 A1    Jan. 23, 2014

Related U.S. Application Data

(60) Provisional application No. 61/476,763, filed on Apr. 19, 2011, provisional application No. 61/470,507, filed on Apr. 1, 2011.

(51) Int. Cl.
*H04W 4/00* (2009.01)
*H04W 48/18* (2009.01)
*H04W 28/24* (2009.01)
*H04W 88/06* (2009.01)

(52) U.S. Cl.
CPC .............. *H04W 48/18* (2013.01); *H04W 28/24* (2013.01); *H04W 88/06* (2013.01)

(58) Field of Classification Search
CPC ............................... H04W 48/16; H04W 88/06
USPC .......................................................... 370/329
See application file for complete search history.

(56) References Cited

U.S. PATENT DOCUMENTS

| | | | |
|---|---|---|---|
| 2006/0133318 A1* | 6/2006 | Jung | H04W 36/30 370/331 |
| 2007/0213055 A1* | 9/2007 | Sundberg | H04W 36/0083 455/436 |

(Continued)

FOREIGN PATENT DOCUMENTS

| | | |
|---|---|---|
| CN | 101426236 A | 5/2009 |
| CN | 101453762 A | 6/2009 |

OTHER PUBLICATIONS ("QoS based Handover layer for a Multi-RAT Mobile Terminal in UMTS and" Vi-MAX Networks; S. Vijay Anand; Jan. 2008).*

(Continued)

*Primary Examiner* — Wei Zhao
*Assistant Examiner* — Abdeltif Ajid
(74) *Attorney, Agent, or Firm* — Morgan, Lewis & Bockius LLP

(57) ABSTRACT

A method in which a terminal transceives data with a first base station supporting first radio access technology (RAT) and a second base station supporting second radio access technology in a radio access system supporting multi-radio access technology.

17 Claims, 14 Drawing Sheets

(56) References Cited

U.S. PATENT DOCUMENTS

2009/0117891 A1    5/2009    Chou
2010/0189047 A1    7/2010    Baum et al.

OTHER PUBLICATIONS ("Architecture and Signaling Protocol for Migration to Cognitive Reconfigurable Post-3G Mobile Systems", Boufidis et al ,Oct. 2008).*

("QoS based Handover layer for a Multi-RAT Mobile Terminal in UMTS and "Vi-MAX Networks; S.Vijay Anand; Jan. 2008).*

Anand, "Qos based Handover layer for a multi-RAT mobile terminal in UMTS and Wi-MAX networks." Communication systems software and middleware and workshops, 2008. COMSWARE 2008. 3rd international conference, Jan. 6-10, 2008.

Boufidis et al. "Architecture and Signaling Protocol for Migration to Cognitive Reconfigurable Post-3G Mobile Systems." Newsletter ACM SIGMOBILE mobile computing and communication review, vol. 12 issue 4, Oct. 4, 2008.

Written Opinion and International Search Report issued in corresponding International Patent Application No. PCT/KR2012/002427 dated Oct. 29, 2012.

Chinese Office Action dated Dec. 21, 2015, in Chinese Patent Application No. 201280016947.0.

\* cited by examiner

METHOD AND APPARATUS FOR TRANSCEIVING DATA IN RADIO ACCESS SYSTEM SUPPORTING MULTI-RADIO ACCESS TECHNOLOGY

TECHNICAL FIELD

The present invention relates to a radio access system supporting multiple radio access technologies (Multi-RAT), and more particularly, to a method and apparatus for transceiving data via at least two heterogeneous networks.

BACKGROUND ART

In a wireless communication environment supportive of two or more heterogeneous networks according to a related art, even if a terminal has capability of accessing multiple radio access technologies (RATs), it is able to simultaneously transceive data with at least two heterogeneous networks by simultaneously accessing the at least two heterogeneous networks.

Namely, a multi-RAT supportive terminal of the related art accessing a prescribed radio access technology on the basis of switching and then transceives data via one network. Hence, while a terminal having multi-RAT capability is transceiving data via a specific network, if the terminal transceives data with another network different from the specific network, the data transceiving with one of the networks is interrupted.

Hence, although a terminal having capability of supporting at least two heterogeneous networks can perform a communication suing the different networks, since the terminal operates based on a simple switching, some limitation is put on efficiency. Moreover, since each of the different networks performs an independent operation, an inefficient management is performed in aspect of an overall flow of the terminal.

In order to solve such a problem, a method for a terminal having multi-RAT capability to simultaneously transceive data via at least two heterogeneous networks ($1^{st}$ system and $2^{nd}$ system), i.e., each network, has been defined. According to the defined method, network/user performance, network capability and user's service quality are enhanced and a bypassing method is provided. For instance, a terminal having multi-RAT capability communicates with two access points including an access point of IEEE 802.11 and an access point of IEEE 802.16. Moreover, for instance, a terminal having multi-RAT capability is able to communicate with an integrated device having both of the IEEE 802.16 interface and the IEEE 802.11 interface.

However, according to the defined method, the multi-RAT terminal can transceive data corresponding to a specific service flow with the $2^{nd}$ system under the control of the $1^{st}$ system only. In order to solve this problem, if there is a traffic preferred by the terminal to transmit to the $2^{nd}$ system in accordance with a property of the flow, a method of informing the $1^{st}$ system of the preferred traffic during a network entry has been proposed. Through this method, if the terminal enters an area of the $2^{nd}$ system, the $1^{st}$ system can instruct the terminal to transceive the corresponding flow via the $2^{nd}$ system.

DISCLOSURE OF THE INVENTION

Technical Objects

According to the embodiments disclosed in the present specification, a terminal having multi-RAT capability can efficiently use a $2^{nd}$ system under the control of a $1^{st}$ system in a broadband wireless communication system. In particular, according to the embodiments disclosed in the present specification, QoS class of a data flow to be used by the $2^{nd}$ system and the $1^{st}$ system is defined.

Technical Solution

To achieve these and other advantages and in accordance with the purpose of the present invention, as embodied and broadly described, a method for transmitting and receiving data by a terminal with a first base station supporting a first radio access technology and a second base station supporting a second radio access technology, in a radio access system supporting a multi-RAT (Radio Access Technology) is disclosed, the method comprising performing an initial network entry process with the first base station, performing a multi-RAT capability negotiation process with the first base station to exchange information necessary for an access to the second base station, performing an access procedure with the second base station, and transmitting and receiving data with both of the first base station and the second base station accessed by the access procedure, wherein the performing of the multi-RAT capability negotiation process comprises transmitting control information indicating at least one quality of service (QoS) class to the first base station, and wherein the at least one QoS class is selected from among a plurality of QoS classes defined ins accordance with a value of at least one QoS parameter.

According to one embodiment, the at least one QoS parameter includes at least one of a sustained traffic rate per flow, a traffic burst, a reserved traffic rate, and a latency.

According to one embodiment, the at least one QoS parameter further includes an uplink grant scheduling type in case of uplink.

According to one embodiment, the at least one QoS class is configured to prefer to communicate, or configured to communicate, with the second base station.

According to one embodiment, the at least one QoS class is configured to prefer to communicate, or configured to communicate, with the first base station.

According to one embodiment, the plurality of QoS classes are defined based on an inclusion relation of quality of service (QoS) parameters.

According to one embodiment, the plurality of QoS classes further include at least one class independent of the inclusion relation.

According to one embodiment, the plurality of QoS classes are defined independently of the inclusion relation.

According to one embodiment, the control information includes a sequence configured to prefer to communicate, or configured to communicate, with the first base station or the second base station between the selected at least one QoS class.

To further achieve these and other advantages and in accordance with the purpose of the present invention, a terminal for transmitting and receiving data with a first base station supporting a first radio access technology and a second base station supporting a second radio access technology, in a radio access system supporting multi-RAT (multi-radio access technology) is disclosed, the terminal comprising a radio frequency unit for transmitting and receiving radio signals; and a controller connected to the radio frequency unit, the controller controlling the radio frequency unit to transmit control information indicating at least one quality of service (QoS) class to the first base station through a multi-RAT capability negotiation process with the first base station, wherein the at least one QoS class is selected from among a plurality of QoS classes defined in accordance with a value of at least one QoS parameter.

To further achieve these and other advantages and in accordance with the purpose of the present invention, a method for transmitting and receiving data by a terminal with a first base station supporting a first radio access technology and a second base station supporting a second radio access technology, in a radio access system supporting a multi-RAT (Radio Access Technology) is disclosed, the method comprising performing an initial network entry process with the first base station, receiving a broadcast message including first control information indicating a first multi-RAT flow class from the first base station, performing a multi-RAT capability negotiation process with the first base station to exchange information necessary for an access to the second base station, performing an access procedure with the second base station, and transmitting and receiving data with both of the first base station and the second base station accessed by the access procedure, wherein the first multi-RAT flow class is defined in accordance with a property of a flow preferring to communicate with the second base station, and wherein the transmitting and receiving of data comprises transmitting and receiving data corresponding to the first control information with the second base station.

According to one embodiment, the performing of the multi-RAT capability negotiation process includes sending to the first base station a message including second control information indicating at least one second multi-RAT flow class different from the first multi-RAT flow class.

According to one embodiment, the method further includes t transmitting and receiving data corresponding to the second control information with the second base station.

To further achieve these and other advantages and in accordance with the purpose of the present invention, a terminal for transmitting and receiving data with a first base station supporting a first radio access technology and a second base station supporting a second radio access technology, in a radio access system supporting a multi-RAT (Radio Access Technology) is disclosed, the terminal comprising a radio frequency unit for transmitting and receiving radio signals; and a controller connected to the radio frequency unit, the controller controlling the radio frequency unit to receive a broadcast message including first control information indicating a first multi-RAT flow class from the first base station, the controller controlling the radio frequency unit to transmit and receive data corresponding to the first control information with the second base station, wherein the first multi-RAT flow class is defined in accordance with a property of a flow preferring to communicate with the second base station.

According to one embodiment, the controller controls the radio frequency unit to send to the first base station a message including a second control information indicating at least one second multi-RAT flow class different from the first multi-RAT flow class.

Advantageous Effects

According to the embodiments disclosed in the present specification, a multi-RAT terminal simultaneously transceives data via at least two heterogeneous networks with the respective networks, thereby reducing overhead of the data transceiving in a specific network.

In particular, according to the embodiments disclosed in the present specification, a parameter necessary for the property of a flow preferred to be transmitted to a $2^{nd}$ system is defined. The parameter is defined as QoS class if necessary. Hence, it is advantageous in reducing signaling overhead.

For instance, in case that a multi-RAT terminal enters a coverage of a $2^{nd}$ system, when a base station determines that data for a specific flow will be switched to the $2^{nd}$ system, it is advantageous in selecting a traffic to be preferentially redirected from a multitude of flows. Moreover, by considering a priority in aspect of a user, an optimized service quality can be provided and a service can be used with a minimum fee.

Meanwhile, according to another embodiment disclosed in the present specification, a base station collectively transmits a multi-RAT flow class to at least one multi-RAT terminal by broadcast and a multi-RAT terminal in need of an update transmits a newly defined multi-RAT flow class to the base station. Hence, overhead of a whole system is reduced and system performance can be enhanced.

BEST MODE FOR INVENTION

Figure 1A:
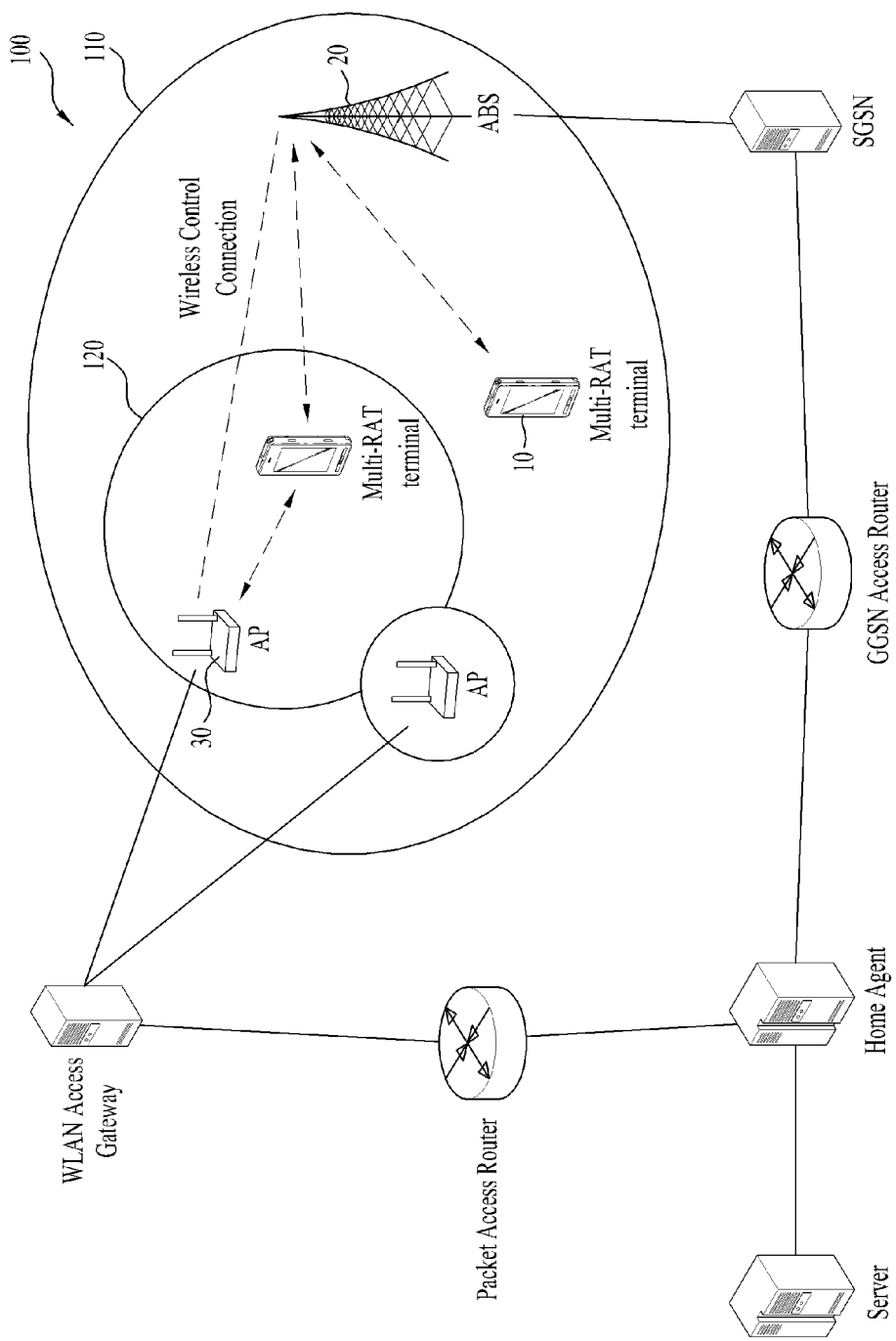
FIG. 1A and FIG. 1B are diagrams for concepts to illustrate multiple radio access technology (multi-RAT) networks to which one embodiment of the present specification is applicable.

The following description may be usable for various wireless communication systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution) and the like. OFDMA can be implemented with such a radio technology as IEEE (Institute of Electrical and Electronics Engineers) 802.11 (Wi-Fi), IEEE 802.16 (WiMAX), IEEE 802.20, E-UTRA (Evolved UTRA) and the like. IEEE 802.16m is an evolved version of IEEE 802.16e and provides backward compatibility with IEEE 802.16e based system.

UTRA is a part of UMTS (Universal Mobile Telecommunications System).

3GPP (3rd Generation Partnership Project) LTE (long term evolution) is a part of E-UMTS (Evolved UMTS) that uses E-UTRA (Evolved-UMTS Terrestrial Radio Access). The 3GPP LTE adopts OFDMA in downlink (DL) and SC-FDMA in uplink (UL). And, LTE-A (LTE-Advanced) is an evolved version of LTE.

Reference will now be made in detail to the preferred embodiments of the present invention, examples of which are illustrated in the accompanying drawings. In the following detailed description of the invention includes details to help the full understanding of the present invention. Wherever possible, the same reference numbers will be used throughout the drawings to refer to the same or like parts and redundant description shall be omitted. If details of the disclosed technology in association with the description of the present invention are determined as making the gist of the present invention unclear, they will be omitted. Moreover, the accompanying drawings are provided to facilitate the understanding of the idea of the present invention only, by which the idea of the present invention should be non-limited. Thus, it is intended that the present invention covers the modifications and variations of this invention that come within the scope of the appended claims and their equivalents.

Terminology Description

QoS (Quality of Service)

Various protocol mechanisms described in the present specification are usable to support QoS for uplink (UL) and downlink (DL) traffics through a terminal and a base station. In the following description, QoS protocol mechanisms and a part of providing an end-to-end QoS are explained.

Requirements for QoS include the following.

a) Configuration and registration function for default service flows b) Signaling function for providing QOS-support service flows and traffic parameters or dynamically setting them c) Use of MAC scheduling for DL service flows and QoS traffic parameters d) Use of QoS traffic parameters for DL service flows e) Grouping service flow properties by named service classes. Hence, upper-layer entities and external applications (e.g., terminal, base station, etc.) can globally request service flows having QoS parameters preferable in direction of consistency.

A core mechanism of providing QoS is to associate packets across MAC interface with a service flow identified by SFID. In this case, the service flow is a unidirectional flow of packets provided with a specific QoS. A terminal and a base station provide this QoS in accordance with a QoS parameter defined in the service flow.

The main object of the QoS features defined therein is to define a transmission sequence and scheduling on a radio interface. Yet, those features may work together with mechanisms except the radio interface in order to provide an end-to-end QoS or monitor an operation of the terminal Service flows exist in UL and DL both and may exist without being substantially activated to deliver traffics. Every service flow has 32-bit SFID. And, each service flow in a certified active state has 4-bit FID as well.

Service Flow

Service flow is a MAC transmission service for providing unidirectional transmission of UL packets transmitted by a terminal and DL packets transmitted by a base station. The service flow is characterized in being configured by QoS parameters including latency, jitter and throughput assurances. For the standard operation between a terminal and a base station, these properties include details indicating how a terminal requests a UL bandwidth assignment and an estimated operation of a UL scheduler of a base station.

The service flow has the features in accordance with the following properties in part.

a) Service flow ID: SFID is assigned to each existing service flow. The SFID is provided as a main identifier for a service flow by a terminal The service flow has a direction associated at least one SFID.

b) FID: Identifier of a transmission connection existing when a service flow is certified or active. When SFID and FID exist, a relation in-between is unique. The SFID is unable to be associated with one or more FID. The FID is unable to be associated with one or more SFID. The FID uniquely identifies a transmission connection in a terminal c) ProvisionedQoSParamSet: QoS parameter set provided by such a means as a network management system d) Admitted QoSParamSet: Setup definition of QoS parameters for a resource reserved by a base station (or a terminal)

e) ActiveQoSParamSet: This defines a set of QoS parameters for a service substantially provided to a service flow.

f) Authorization Module: Logical function within a base station for authorizing or rejecting all changes of QoS parameters and classifiers associated with a service flow. Hence, Authorization Module defines an envelope for restricting estimated values of AdmittedQoSParamSet and ActiveQoSParamSet.

Service Classes

Service classes are provided for the following purposes.

a) Service class enables an operator to move a load on the configuration of service flows to a base station from authorization provisioning server. The operator provides a terminal with a service class name. Implementation of the name is configured by a base station. This enables the operator to change implementation of a prescribed service into a local environment without changing terminal authorization provisioning. For instance, some scheduling parameters may need to be modified differently for two different base stations to provide the same service. For another instance, a service profile can be changed depending on a time.

b) Service class enables an upper layer protocol to create a service flow by a name of a name of the corresponding service class. For instance, when a phone call is made, a signaling enables a terminal to predict any available services of Class G711.

NOTE—Service classes just indicate IDs for a specific set of QoS parameter set values. Hence, a use of the service class is optional. A service identified by a service class is not different from the same QoS parameter set that is explicitly designated. And, the corresponding service is set up once.

Every service flow can have a corresponding QoS parameter set clarified in one of the following methods.

a) Method of including all traffic parameters explicitly b) Method of indirectly referring to a set of traffic parameters by designating a service class name c) Method of designating a service class name in accordance with modification of parameters If a base station successfully admits a service flow, a service class name is extended to a set of the defined parameters. The service class extension may be included in a base station-originated message, i.e., AAI-DSA-REQ, AAI-DSC-REQ, AAI-DSA-RSP, AAI-DSC-RSP, etc. In all cases, a base station can include a service flow encoding including a service class name and a QoS parameter set of a service class. If a terminal-initiation request includes added or overlapping service flow parameters, a successful reply can include the parameters as well.

If a service class name is included in an admission or activation request, a returned QoS parameter set can be changed into activation from activation. This is attributed to the change of management of the QoS parameter set of a service class in a base station. If the service class name is changed in the base station (e.g., the associated QoS parameter set is modified), it does not affect QoS parameters of current service flows associated with the corresponding service class. The base station resets DSC transaction to a current service flow that refers to a service class name for affecting the changed service class definition.

When a terminal uses a service class name to designate admitted QoS parameter sets, an extended parameter set of a service flow may be returned into a response message (e.g., AAI-DSA-RSP, AAIDSC-RSP, etc.). If a service class name in an activation request is used in the future, it may fail unless definition of a service class name is changed and newly requested resources are available. Hence, the terminal can explicitly request a parameter set extending from a reply message in the course of making an activation request in the future.

Global Service Classes

Global service class name is based on rules and is a synthetic name parsed in the variable number of information field formats.

a) When i=1, a format is ISBRLSPS1R and a length is 5 bytes.

b) When i=0 and S2=0 or 1, a format is ISBRLSPS1S2R and a length is 5 bytes.

c) When i=0 and S2=2 or 3, a format is ISBRLSPS1S23R and a length is 6 bytes.

d) When i=0 and S2=4, a format is ISBRLSPS1S23S5R and a length is 6 bytes.

e) When i=0 and S2=5 or 3, a format is ISBRLSPS1S2L1D3S4R and a length is 7 bytes.

f) When i=0 and S2=6 or 3, a format is ISBRLSPS1S2L1S4R and a length is 7 bytes.

g) When i=0 and S2=7 or 3, a format is ISBRLSPS1S2L1S3S6S7S8S9S10R and a length is 11 bytes.

Table 1 in the following shows global service class name information field parameters.

TABLE 1

| Location | Name | Size | Value |
|---|---|---|---|
| I | UL/DL indicator | 1 | 0 = UL, 1 = DL |
| S | Maximum sustained traffic rate per flow | 6 | Value of 0b111111 indicates a maximum allowed value. |
| B | Maximum traffic burst | 6 | Value of 0b111111 indicates a maximum allowed value. |
| R | Maximum reserved traffic burst | 6 | Value of 0b111111 indicates a maximum allowed value. |
| L | Maximum latency | 6 | Value of 0b111111 indicates a maximum allowed value. |
| ... | | | |
| S2 | UL grant scheduling type | 3 | When 1 = undefined 2 = BE3 = nrtPS4 = rtPS5 = ertPS6 = UGS7 = aGP ServiceI = 0, this field is included. |
| L1 | Allowable jitter | 6 | Value of 0b111111 indicates a maximum allowed value. This is usable only if UL grant scheduling type = ertPS, aGP Service or USG. This field is included when I = 0 and S2 = 2, 3, 4 or 5. |
| S3 | Traffic priority | 3 | This is usable only if UL grant scheduling type = ertPS, aGP Service or BE. This field is included when I = 0 and S2 =2, 3, 4 or 5. |
| S4 | Unrequested grant interval | 6 | This is usable only if UL grant scheduling type = ertPS or USG. This field is included when I = 0 and S2 = 2 or 6. |
| S5 | Unrequested polling interval | 6 | This is usable only if UL grant scheduling type = ertPS. This field is included when I = 0 and S2 = 7. |
| S6 | Main GPI | 6 | This is usable only if UL grant scheduling type = aGP Service. This field is included when I = 0 and S2 = 7. |
| S7 | Main grant size | 6 | This is usable only if UL grant scheduling type = aGP Service. This field is included when I = 0 and S2 = 7. |
| S8 | Auxiliary GPI | | This is usable only if UL grant scheduling type = aGP Service. This field is included when I = 0 and S2 = 7. |
| S9 | Auxiliary grant size | | This is usable only if UL grant scheduling type = aGP Service. This field is included when I = 0 and S2 = 7. |
| S10 | Application method | | This is usable only if UL grant scheduling type = aGP Service. This field is included when I = 0 and S2 = 7. |
| ... | | | |

Maximum Sustained Traffic Rate

This is a parameter that defines a maximum information rate of a service. This rate is represented as bits per second and includes service data units (SDUs) from an input to a system. Explicitly, this parameter does not include such a network overhead as a transmission, a protocol, a MAC header and a CRC or a session sustained overhead (not payload) as SIP, MGCP, H.323 management and the like. This parameter does not put an instant restriction on a rate of a service, which is because this parameter is controlled by a physical attribute of an entry port. Yet, in a destination network interface in a UL direction, a service is controlled to abide by this parameter over average.

MAXIMUM Traffic Burst

Maximum traffic burst parameter defines a maximum burst size acceptable for a service. Since each of a physical speed of an entry/exit port, any radio interface and a backhaul is generally greater than a maximum sustained traffic rate parameter, this parameter describes that a maximum sustained burst system should accept this service on the assumption that a service does not use any available resource. A maximum traffic burst set to 0 does not mean any maximum traffic burst reservation request.

Minimum Reserved Traffic Rate

Minimum reserved traffic rate designates a minimum rate reserved for this service flow as bits per second. A base station can satisfy a connection up to the minimum reserved traffic rate. If a bandwidth lower than the minimum reserved traffic rate is requested for the connection, the base station can reassign an excessive reserved bandwidth to another purpose. A value of this parameter is calculated as exceeding a MAC overhead. A minimum reserved traffic set to 0 means that the minimum reserved traffic rate is not requested.

Maximum Latency

A value of this parameter explicitly indicates a maximum interval between a packet reception in CS of BS or SS and a transmission to a radio interface of SDA. If this value is defined, this parameter indicates a service responsibility and can be secured. If a maximum latency is 0, it can be construed as having no responsibility.

In the following description, a method for a terminal to access at least two heterogeneous networks (or multi-RAT) and transceive data via the respective networks simultaneously in a multi-radio access technology (multi-RAT) network is explained.

First of all, Multi Radio Access Technology (RAT), to which one embodiment of the present specification is applicable, is described as follows.

Figure 1B:
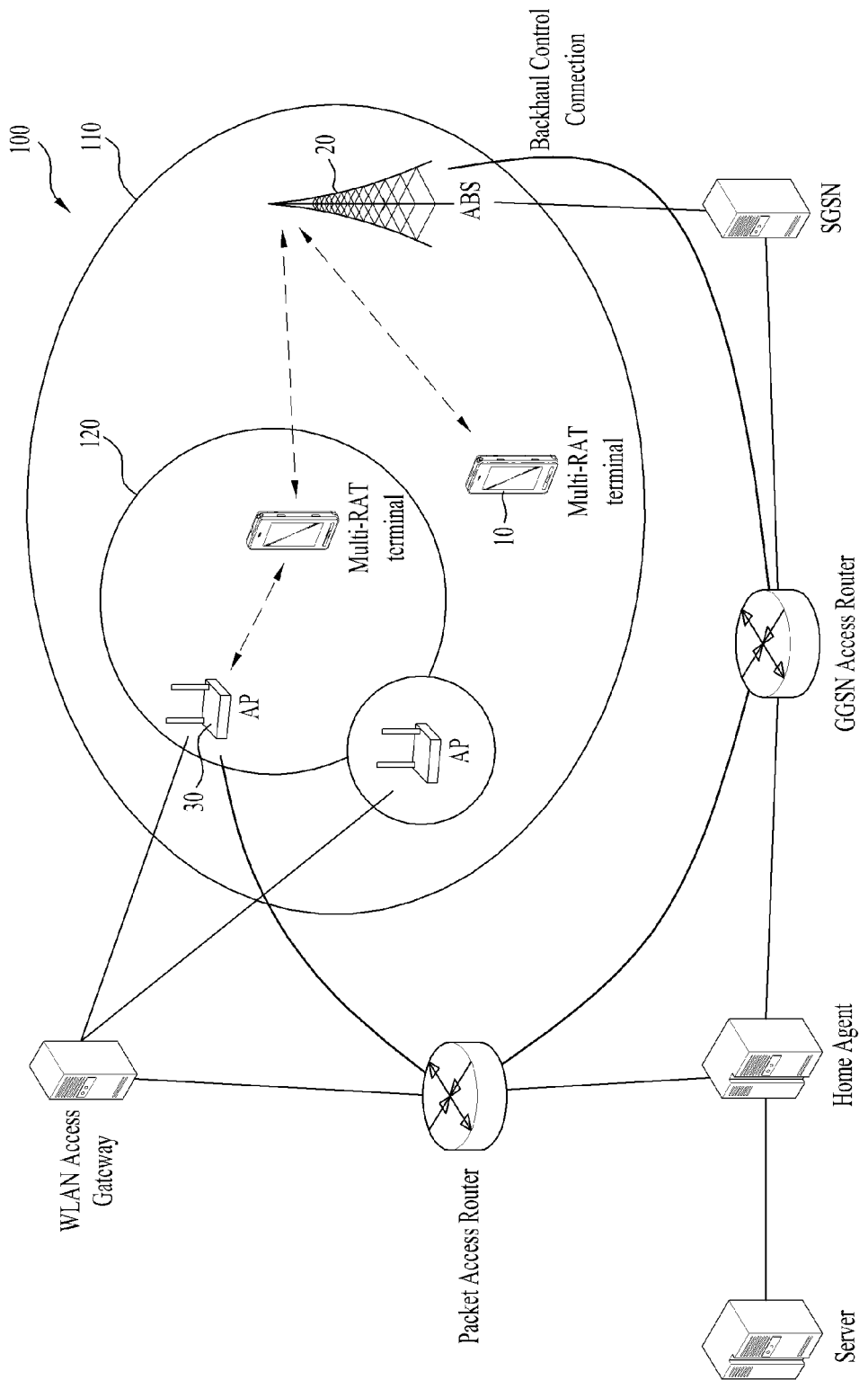

FIG. 1A and FIG. 1B are diagrams for concepts to illustrate multiple radio access technology (multi-RAT) networks to which one embodiment of the present specification is applicable.

Multi-radio access technology (hereinafter abbreviated multi-RAT) network means a wireless communication environment in which at least two or more heterogeneous networks exist and in which a terminal can simultaneously perform communications by accessing the at least two heterogeneous networks.

In this case, the terminal capable of simultaneously performing communications with at least two heterogeneous networks is named a multi-RAT terminal or a multi-system terminal The heterogeneous network (or heterogeneous system) means a network that uses a communication protocol different from that used by a specific network with reference to the specific network.

For instance, WiMAX network, which is one example of a mobile communication system, and WiFi network, which uses WiFi, correspond to the heterogeneous networks.

RAT is a type of a technology used for a radio access. For instance, RAT may include GERAN (GSM/EDGE Radio Access Network), UTRAN (UMTS Terrestrial Radio Access network), E-UTRAN (Evolved-UMTS Terrestrial Radio Access Network), WiMAX, LTE/LTE-A, WiFi and the like. Namely, GERAN, UTRAN, E-UTRAN, WiMAX and/or WiFi coexist in the same area.

Referring to FIG. 1, a multi-RAT network 100 may include a $1^{st}$ system (i.e., a primary system) 110 and a $2^{nd}$ system (i.e., a secondary system) 120.

In this case, the $1^{st}$ system 110 and the $2^{nd}$ system 120 may be represented as a $1^{st}$ network and a $2^{nd}$ network, respectively. The $1^{st}$ system 110 may include a multi-RAT terminal 10, a base station 20 and the $2n^d$ system. Moreover, the $2^{nd}$ system 120 may include the multi-RAT terminal 10 and an AP (access point) 30.

The $1^{st}$ system may include a mobile communication system as a system having a wider range of coverage. And, the $1^{st}$ system may include a system responsible for a transmission of control information. For instance, the $1^{st}$ system may include a WiMAX system or an LTE/LTE-A system. And, the $1^{st}$ system means a system that always has a status with the multi-RAT terminal. In particular, the $1^{st}$ system means the system that maintains an active state, a sleep mode state or an idle mode state with the multi-RAT terminal. Moreover, the multi-RAT terminal may perform an initial connection to the $1^{st}$ system.

The $2^{nd}$ system may include a short range communication system (WLAN) as a system having a smaller range of coverage. And, the $2^{nd}$ system may include a system responsible for a transmission of data. For instance, the $2^{nd}$ system may include a Wi-Fi system. In particular, the $2^{nd}$ system means the system that can be added to or removed from a multi-RAT network. Moreover, the $2^{nd}$ system may be mainly used for the data transceiving that requires higher BW (bandwidth). Hence, a specific flow (QoS) may be mapped for the use of the $2^{nd}$ system. A connection or release between the $2^{nd}$ system and the multi-RAT terminal may be possible after confirmation from the $1^{st}$ system.

If the multi-RAT terminal is connected to the $2^{nd}$ system, it may mean that the multi-RAT terminal is ready to transceive data with the $2^{nd}$ system or that the multi-RAT terminal is transceiving data with the $2^{nd}$ system. If it is detected that the multi-RAT terminal has entered a coverage of the $2^{nd}$ system, the multi-RAT terminal can receive an information on an access to the $2^{nd}$ system from the $1^{st}$ system. In doing so, an actual data transceiving may not occur instantly. In case that there is data the multi-RAT terminal should transceive via the $2^{nd}$ system, it may receive access information on a corresponding flow from the $1^{st}$ system. In doing so, an actual data transceiving may occur instantly.

In this case, an access point (AP), which is one example of a base station of the $2^{nd}$ system, can operate in the same manner of a terminal capable of communicating with the $1^{st}$ system.

Moreover, in a multi-RAT network, a $1^{st}$ system and a $2^{nd}$ system are connected by wire or wireless. In particular, the base station of the $1^{st}$ system and the base station of the $2^{nd}$ system may be connected via a backbone network by wire [FIG. 1B] or by wireless [FIG. 1A].

In the following description, for clarity unless mentioned particularly, assume that a $1^{st}$ system and a $2^{nd}$ system include WiMAX system and Wi-Fi system, respectively. Hence, a base station corresponding to the $1^{st}$ system shall be represented as 'base station or ABS' and a base station corresponding to the $2^{nd}$ system shall be represented as 'AP (access point)'. Moreover, an access to the $1^{st}$ system may be used as the same meaning of an access to the base station or ABS and an access to the $2^{nd}$ system may be used as the same meaning of an access to the AP.

Figure 2:
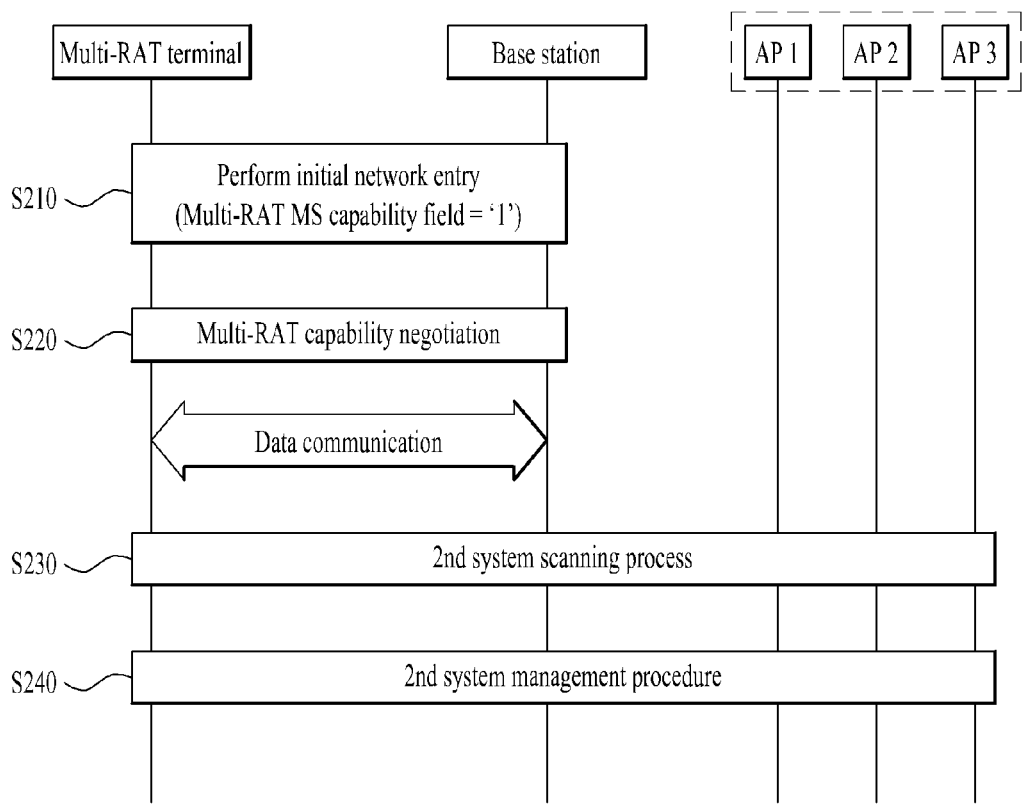
FIG. 2 is a flowchart of a method for a multi-RAT terminal to transceive data via a $1^{st}$ system and a $2^{nd}$ system.

FIG. 2 is a flowchart of a method for a multi-RAT terminal to transceive data via a $1^{st}$ system and a $2^{nd}$ system.

Referring to FIG. 2, a multi-RAT terminal performs an initial network entry process on a base station [S210].

Through the initial entry process performed on the base station, the multi-RAT terminal transmits an indicator, which indicates that the multi-RAT terminal is a terminal supportive of multi-RAT, to the base station. In this case, the indicator may include a multi-RAT terminal capability field (Multi-RAT MS capability field). And, the indicator, i.e., the multi-RAT MS capability field may have a 1-bit size.

The indicator may be transmitted through a registration procedure performed in the course of performing the initial network entry process on the base station. In doing so, the indicator may be transmitted to the base station through a registration request or response message (REG-REQ/RSP message).

For instance, if the indicator is set to 1, it may indicate the terminal that supports the multi-RAT. If the indicator is set to 1, it may indicate the terminal that does not support the multi-RAT.

If the base station receives the registration request or response message including the indicator (e.g., the indicator set to 1) indicating the presence of the multi-RAT supportive capability from the multi-RAT terminal, the base station can transmit an information, which indicates that a separate multi-RAT capability negotiation process for supporting the multi-RAT terminal will be performed after completion of the initial network entry process or after prescribed duration, to the multi-RAT terminal For instance, if the indication information is set to 1, it indicates that the base station and the multi-RAT terminal will perform a separate capability negotiation process to support the multi-RAT. If the indication information is set to 0, it indicates that the separate capability negotiation process does not need to be performed.

Subsequently, if the multi-RAT terminal completes the initial network entry process performed on the base station, the multi-RAT terminal and the base station perform a multi-RAT capability negotiation process together [S220]. In this case, the multi-RAT capability negotiation process is generally performed after completion of a network entry or reentry process. Instead, the multi-RAT capability negotiation process may be performed in the course of performing the network entry or reentry process on the base station.

For instance, in case that the multi-RAT capability negotiation process is performed in the course of the network entry or reentry process, the multi-RAT terminal and the base station can perform the multi-RAT capability negotiation process through a registration procedure of the base station and the multi-RAT terminal In doing so, the multi-RAT terminal and the base station transceive information on the multi-RAT capability negotiation with each other through a registration request (REG-REQ) message and a registration response (REG-RSP) message.

A multi-RAT capability negotiation process between the multi-RAT terminal and the $1^{st}$ system shall be described in detail with reference to FIG. 3 later.

Thereafter, the multi-RAT terminal performs an AP scanning process for an access to the $2^{nd}$ system based on a $2^{nd}$ system related information received from the base station [S230].

In doing so, for the access to the $2^{nd}$ system, the multi-RAT terminal performs a scanning process on neighbor APs by periods or by event triggering.

First of all, a connection for all data transmitted to the multi-RAT terminal is established through a dynamic service procedure (DSx procedure) with the base station of the $1^{st}$ system. And, a communication of the multi-RAT terminal with the $2^{nd}$ system is performed on the assumption that data for a specific flow is transmitted to the $2^{nd}$ system under the determination of the base station of the $1^{st}$ system.

Moreover, the scanning performed on the AP of the $2^{nd}$ system by the multi-RAT terminal is assumed as performed under the instruction made by the base station of the $1^{st}$ system. This assumption is made for the power saving of the multi-RAT terminal The AP scanning process of the multi-RAT terminal for the access to the $2^{nd}$ system is performed in a following manner. First of all, the multi-RAT terminal receives a multi-RAT scan command message from the base station. Secondly, the multi-RAT terminal performs the corresponding scanning based on the received multi-RAT scan command message. Finally, the multi-RAT terminal sends a multi-RAT scan report message to report the result of the scanning to the base station.

Besides, the scanning process of the multi-RAT terminal for the access to the $2^{nd}$ system shall be described in detail with reference to FIG. 4 explained later.

Thereafter, the multi-RAT terminal performs a management (or operation) procedure with the $2^{nd}$ system [S240]. In this case, the management procedure with the $2^{nd}$ system means such a process as a connection of the multi-RAT terminal to the $2^{nd}$ system, a release of the connection, a change of the connection and the like. In doing so, the management procedure of the $2^{nd}$ system is controlled by the $1^{st}$ system.

Having completed the $2^{nd}$ system accessing procedure, the multi-RAT terminal transceives data via the AP of the $2^{nd}$ system.

In doing so, in order for the multi-RAT terminal to access the $2^{nd}$ system, the multi-RAT terminal should receive an acknowledgement of the access to the $2^{nd}$ system from the $1^{st}$ system.

In particular, as mentioned in the foregoing description, before the base station sends the multi-RAT terminal the acknowledgement of the access of the multi-RAT terminal to the $2^{nd}$ system, the base station selects the AP to be accessed by the multi-RAT terminal and then checks a state of the selected AP. As a result of the check, if the access to the selected AP is available, the base station can transmit information on the multi-RAT terminal to the selected AP in advance.

Moreover, when the base station transmits the acknowledgement to the multi-RAT terminal, the base station can transmit information necessary or useful for the multi-RAT terminal to access the AP as well.

For instance, the necessary or useful information may include SSID, MAC address of AP, WEP Key, channel number (e.g., frequency information, etc.), protocol version (e.g., 11a/b/n . . . ) of AP, information on offset between beacon and frame of base station (e.g., a relative location of beacon is transmitted in a manner of being represented as a difference from a specific frame time), etc.

Moreover, as a result of the AP scanning performed by the multi-RAT terminal for the access to the $2^{nd}$ system, if recognizing that the multi-RAT terminal has entered the coverage of the $2^{nd}$ system, a request for the access to the $2^{nd}$ system can be made by the multi-RAT terminal to the base station of the $1^{st}$ system.

Messages required for the $2^{nd}$ system management procedure may include the followings.

1. $2^{nd}$ system request (SS_REQ) message

This is used for a multi-RAT terminal to make a request for an access to AP

2. $2^{nd}$ system command (SS_CMD) message

This is a message used to manage an access to AP and is used for a connection to AP, a release of the connection, a change of the connection and the like.

3. $2^{nd}$ system indication (SS_IND) message

This is a message used as an response to the $2^{nd}$ system command message and is used for a multi-RAT terminal to inform a base station of a successful connection to AP, a successful release of the connection, a successful change of the connection and the like.

Finally, if the multi-RAT terminal successfully completes the access to the AP of the $2^{nd}$ system, the multi-RAT terminal transceives data with the $1^{st}$ system and is also able to transceive data with the $2^{nd}$ system simultaneously. In doing so, the data transceived with the multi-RAT terminal via the AP is controlled by the $1^{st}$ system.

Multi-RAT Capability Negotiation Process

A process for multi-RAT capability negotiation between a multi-RAT terminal and a base station is described in detail as follows.

Figure 3:
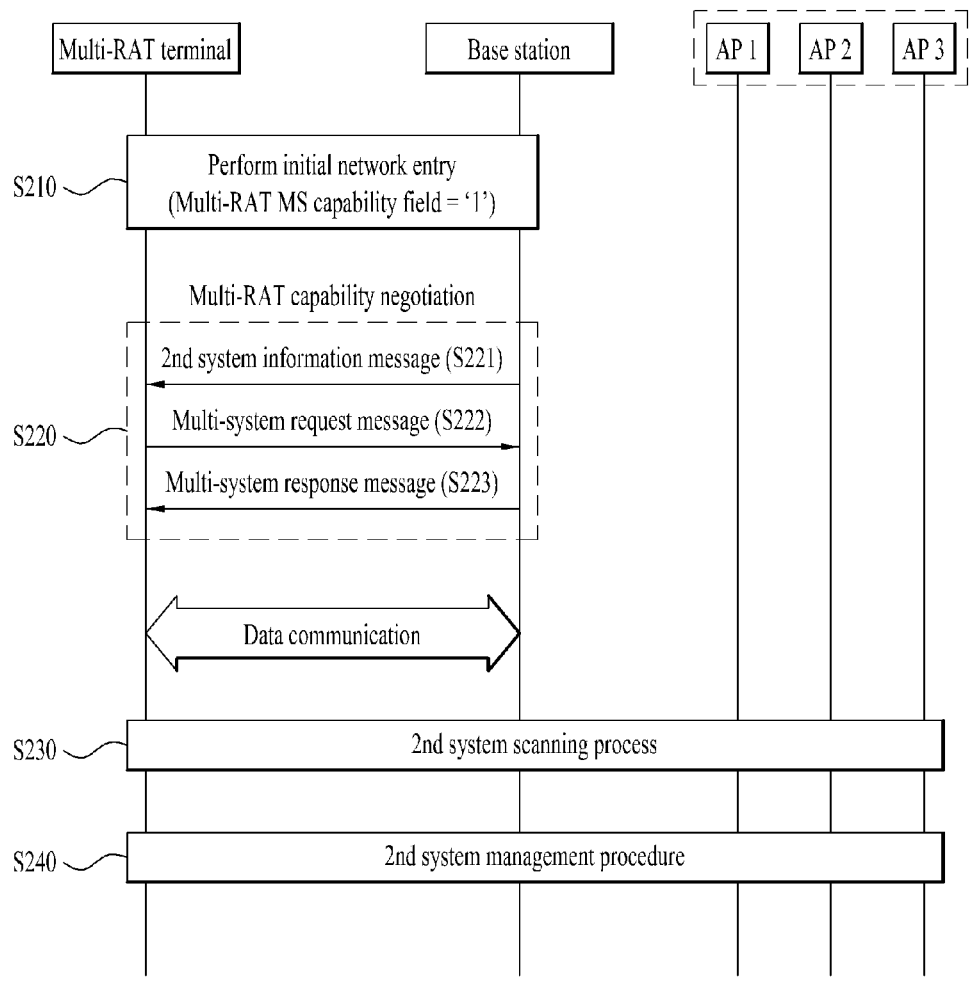
FIG. 3 is a flowchart of a multi-RAT capability negotiation process between a multi-RAT terminal and a $1^{st}$ system.

FIG. 3 is a flowchart of a multi-RAT capability negotiation process between a multi-RAT terminal and a $1^{st}$ system.

First of all, since contents of the steps S210, S230 and S240 shown in FIG. 3 are identical to those of the former steps shown in FIG. 2, the corresponding details shall be omitted from the following description. Yet, the different step S220 shall be described in detail as follows.

As mentioned in the foregoing description, the multi-RAT capability negotiation process between the multi-RAT terminal and the base station is performed after the network entry or reentry.

In doing so, in case of the network reentry, the multi-RAT terminal process may be omitted. In particular, since the negotiation of the multi-RAT capability has been already performed through an initial network entry procedure between the multi-RAT terminal and the base station, when the multi-RAT terminal reenters the network of the same system, it may cause unnecessary overhead if the multi-RAT terminal repeats the same procedure.

In case of a handover (HO), a target base station of the $1^{st}$ system can perform a multi-RAT capability negotiation with the multi-RAT terminal via a backbone network from a serving base station of the $1^{st}$ system in advance.

A process for the multi-RAT terminal to perform the multi-RAT capability negotiation with the $1^{st}$ system can be performed in a following manner.

First of all, the base station can transmit information related to the 2ne system to the multi-RAT terminal [S221]. In particular, if there is common information, which should be received by the multi-RAT terminal, on APs of the $2^{nd}$ system, the base station can transmit the AP information to the multi-RAT terminal by broadcast or unicast.

In this case, the information related to the $2^{nd}$ system may include the information on a heterogeneous system belonging to the same coverage of the $1^{st}$ system. In particular, it may be unnecessary for the multi-RAT terminal to be aware of all $2^{nd}$ systems included in the $1^{st}$ system and information related to the $2^{nd}$ systems. If so, the base station does not transmit all informations related to the $2^{nd}$ system but may be able to transmit a list of informations related to (or necessary for) the multi-RAT terminal to the multi-RAT terminal by unicast. In doing so, the list can be transmitted in the course of the multi-RAT capability negotiation process.

Subsequently, the multi-RAT terminal sends a multi-system capability request message to the base station [S222]. In the multi-system capability request message, for example, an 802.11 MAC address of the terminal, a previously accessed AP information (e.g., information on an AP preferred by the terminal), a protocol version information of 802.11, a traffic property defined to communicate by 802.11 and the like can be included. The MAC address of 802.11 is required for authentication information. If the previous access PA information is included in the multi-system capability request message the corresponding message is sent on to a base station to which a previously accessed AP belongs.

Thereafter, the base station sends a multi-system capability response message to the multi-RAT terminal in response to the multi-system capability request message [S223].

In the multi-system capability response message, information on AP candidates can be included. Moreover, in case that a network reentry is performed, the multi-RAT capability negotiation process can be emitted. If the multi-RAT terminal performs a handover, it can perform a capability negotiation process via a backbone network from a serving base station.

Moreover, if a multi-RAT terminal enters an idle mode, the base station can save the information, which is obtained through the multi-RA capability negotiation process with the multi-RAT terminal, for predetermined duration. In particular, a multi-RAT information sustained timer is newly defined. The base station saves the obtained information until the multi-RAT information sustained timer expires. After the expiration of the timer, the base statin can discard the obtained information.

Therefore, before the multi-RAT information sustained timer expires, if the multi-RAT terminal performs a network reentry into the base station, the multi-RAT capability negotiation process can be skipped.

$2^{nd}$ System Scanning Process

In the following description, a process for a multi-RAT terminal to scan a $2^{nd}$ system is explained in detail.

Figure 4:
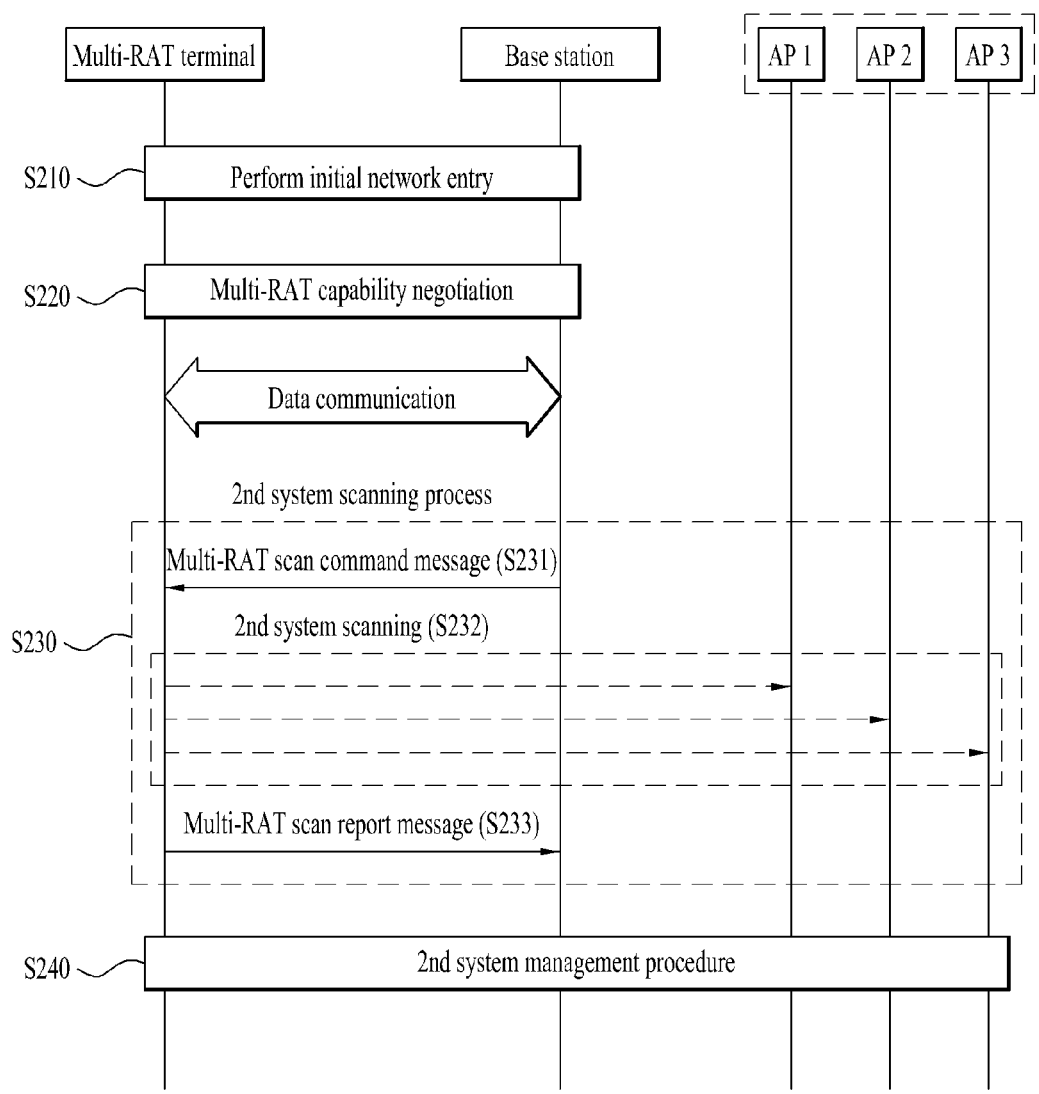
FIG. 4 is a flowchart of a process for a multi-RAT terminal to scan a $2^{nd}$ system.

FIG. 4 is a flowchart of a process for a multi-RAT terminal to scan a $2^{nd}$ system.

Since contents of the steps S210, S220 and S240 are identical to those of the former steps shown in FIG. 2, the corresponding details shall be omitted from the following description. Yet, the different step S230 shall be described in detail as follows.

First of all, the base station can start to scan the $2^{nd}$ system under the instruction of the base station without a request made by a multi-RAT terminal In this case, a condition for the base station to request the scanning corresponds to a case that the base station determines that a specific data flow needs to communicate using WiFi or a case that a preferred AP is registered with a cell of the base station. In this case, the base station instructs the multi-RAT terminal to scan neighbor APs.

In particular, the base station sends a multi-RAT scan command (Multi RAT_SCN-CMD) message or AAI_SCN-RSP to the multi-RAT terminal [S231]. In this case, in order to enable the multi-RAT terminal to scan the neighbor APs quickly, the multi-RAT scan command message and the AAI_SCAN-RSP can include SSID of the neighbor AP, beacon transmission periodicity and scanning interval information. Moreover, the multi-RAT scan command message and the AAI_SCAN-RSP can further include BSSType (e.g., infrastructure BSS, IBSS, or both), BSSID, SSID, scan type (active or passive), ProbeDelay (i.e., delay time sued before transmitting a probe frame), ChannelList, MinMax Channel time and the like.

Alternatively, the base station may transmit MULTI-RAT_SCAN_DEADLINE to the multi-RAT terminal After the base station has instructed the scanning to the multi-RAT terminal, if the base station fails in receiving such a response message as SCN-REP within MULTIRAT_SCAN_DEADLINE time, the base station controls the transceiving of the data of the corresponding flow to be performed via the $1^{st}$ system.

In this case, as mentioned in the foregoing description, the scanning performed by the multi-RAT terminal may not be initiated by the instruction made by the base station. Instead, the multi-RAT terminal may be able to directly request the scanning for the access to the $2^{nd}$ system to the base station of the $1^{st}$ system. In this case, the multi-RAT terminal and the base station may perform the scanning on neighbor AP through a probe request/response transceiving process.

In doing so, the multi-RAT terminal performs the scanning for the access to the $2^{nd}$ system in the course of transceiving data with the base station of the $1^{st}$ system. In this case, the multi-RAT terminal may instruct SCN-REP transmission protocol only through SCN-CMD message without the scanning interval setting with the base station.

In particular, in case of receiving the multi-RAT scan command message from the base station, the multi-RAT terminal performs the scanning on AP neighbor to the multi-RAT terminal by receiving a beacon from the AP or transceiving a probe request and response based on the information included in the received multi-RAT scan command message [S232]. In this case, the AP neighbor to the multi-RAT terminal may include APs of the $2^{nd}$ system within the base station coverage of the $1^{st}$ system.

Subsequently, the multi-RAT terminal sends a multi-RAT scan report (MultiRAT_SCN-REP) message or AAI SCN-REP to the base station of the $1^{st}$ system [S233]. In particular, the multi-RAT terminal transmits the scanning result of the detected AP to the base station. In doing so, the multi-RAT terminal can transmit a received signal strength indicator (RSSI) for each AP or a preferred AP information of the multi-RAT terminal as well.

Under the instruction of the CMD message, the scan report message or the AAI_SCN-REP can be transmitted once, periodically, on the basis of event triggering, or on the basis of a trigger condition, for example. Moreover, in doing so, the multi-RAT terminal can transmit the scanning result of the AP to the base station in accordance with the definition of an AP-specific triggering condition. In this case, the AP-specific trigger condition can be determined for each flow.

For instance, if a scan report mode in the multi-RAT scan command message most recently received from the base station is set to 0b10, the multi-RAT terminal can send the multi-RAT scan report message to the base station by event triggering.

In this case, if the scan report trigger condition is met, the multi-RAT terminal sends the multi-RAT scan report message to the base station.

For another instance, for a periodic scan report (e.g., a case that a report mode is set to 0b01) or a one-time scan report (e.g., a case that a report mode is set to 0b11), the multi-RAT terminal can report the scan result to the base station at a time explicitly disclosed in the multi-RAT scan command message except the scanning interval.

In case that the multi-RAT terminal periodically makes a scan report to the base station, the multi-RAT terminal can stop the AP scanning result report after all scanning intervals in the multi-RAT scan command message.

The multi-RAT scan report message includes all scanning results available for the requested APs explicitly disclosed in the multi-RAT scan command message.

In order to report the scanning result to the base station at any time or to selectively receive a multi-RAT neighbor advertisement message having a system information on a requested system and a system information on other RATs determining that the base station is located in the vicinity of the multi-RAT scan command message from the base station by unicast, the multi-RAT terminal can send a multi-RAT scan report message to the base station.

Besides, the multi-RAT terminal enables a neighbor request RAT type indicator and/or SSIDs (or BSSID, MACT address) to be included in the scan report message, thereby instructing the base station to filter a neighbor $2^{nd}$ system list based on a requested radio type.

Subsequently, if the base station receives the result of scanning a plurality of APs from the multi-RAT terminal, i.e., if the base station receives the multi-RAT scan report message, the base station selects an optimal system, i.e., an optimal AP in consideration of the same operator, a priority of the terminal, a channel quality, a load balancing, a transmitted traffic and/or the like and is then able to inform the multi-RAT terminal of the selected system or AP.

According to another embodiment, in order for the multi-RAT terminal to perform a scanning process for the $2^{nd}$ system, the multi-RAT terminal can use a previously transceived message instead of the above-defined multi-RAT scan command/report message. In doing so, if the multi-RAT terminal performs the scanning on the $2^{nd}$ system using the previous message, the previous message can include an information indicating that the object of the scanning performed by the multi-RAT terminal is to transceive data using a multi-RAT system. In particular, a filed capable of indicating an SSID, BSSID or MAC address of a target system is newly defined to indicate a scanning target of the multi-RAT terminal Thereafter, the multi-RAT terminal performs a procedure for an access to the $2^{nd}$ system and then transceives data with the $2^{nd}$ system. In doing so, a connection to the $2^{nd}$ system, a release of the connection, a connection change and the like correspond to the $2^{nd}$ system operating (or managing) process. Moreover, the $1^{st}$ system controls the management of the $2^{nd}$ system.

In doing so, in order for the multi-RAT terminal to access the $2^{nd}$ system, the multi-RAT terminal should receive acknowledgement of the access to the $2^{nd}$ system from the $1^{st}$ system.

In particular, as mentioned in the foregoing description, before the base station sends the acknowledgement of the access to the $2^{nd}$ system to the multi-RAT terminal, the base station selects an AP the multi-RAT terminal will access and then checks a state of the selected AP. As a result of the check, if the access to the selected AP is possible, the base station transmits an information on the multi-RAT terminal to the selected AP in advance.

Moreover, when the base station transmits the acknowledgement to the multi-RAT terminal, the base station can transmit information necessary or useful for the multi-RAT terminal to access the AP as well.

For instance, the necessary or useful information may include SSID, MAC address of AP, WEP Key, channel number (e.g., frequency information, etc.), protocol version (e.g., 11a/b/n . . . ) of AP, information on offset between beacon and frame of base station (e.g., a relative location of beacon is transmitted in a manner of being represented as a difference from a specific frame time), etc.

Moreover, as a result of the AP scanning performed by the multi-RAT terminal for the access to the $2^{nd}$ system, if recognizing that the multi-RAT terminal has entered the coverage of the $2^{nd}$ system, a request for the access to the $2^{nd}$ system can be made by the multi-RAT terminal to the base station of the $1^{st}$ system.

Second (i.e., Secondary) System Management

In the following description, a method of managing (or operating) a $2^{nd}$ system is explained in detail. In this case, the $2^{nd}$ system management means a connection between the $2^{nd}$ system and the multi-RAT terminal, a release of the connection, and a change of the connection between the multi-RAT terminal and the $2^{nd}$ system. And, the $2^{nd}$ system management is controlled by a base station, i.e., the $1^{st}$ system.

For one example of the $2^{nd}$ system managing method, a process for the multi-RAT terminal to access (or to be connected to) the $2^{nd}$ system, i.e., a process for the multi-RAT terminal to simultaneously transceive data with the $1^{st}$ system and the $2^{nd}$ system by adding the $2^{nd}$ system, is described as follows.

Figure 5:
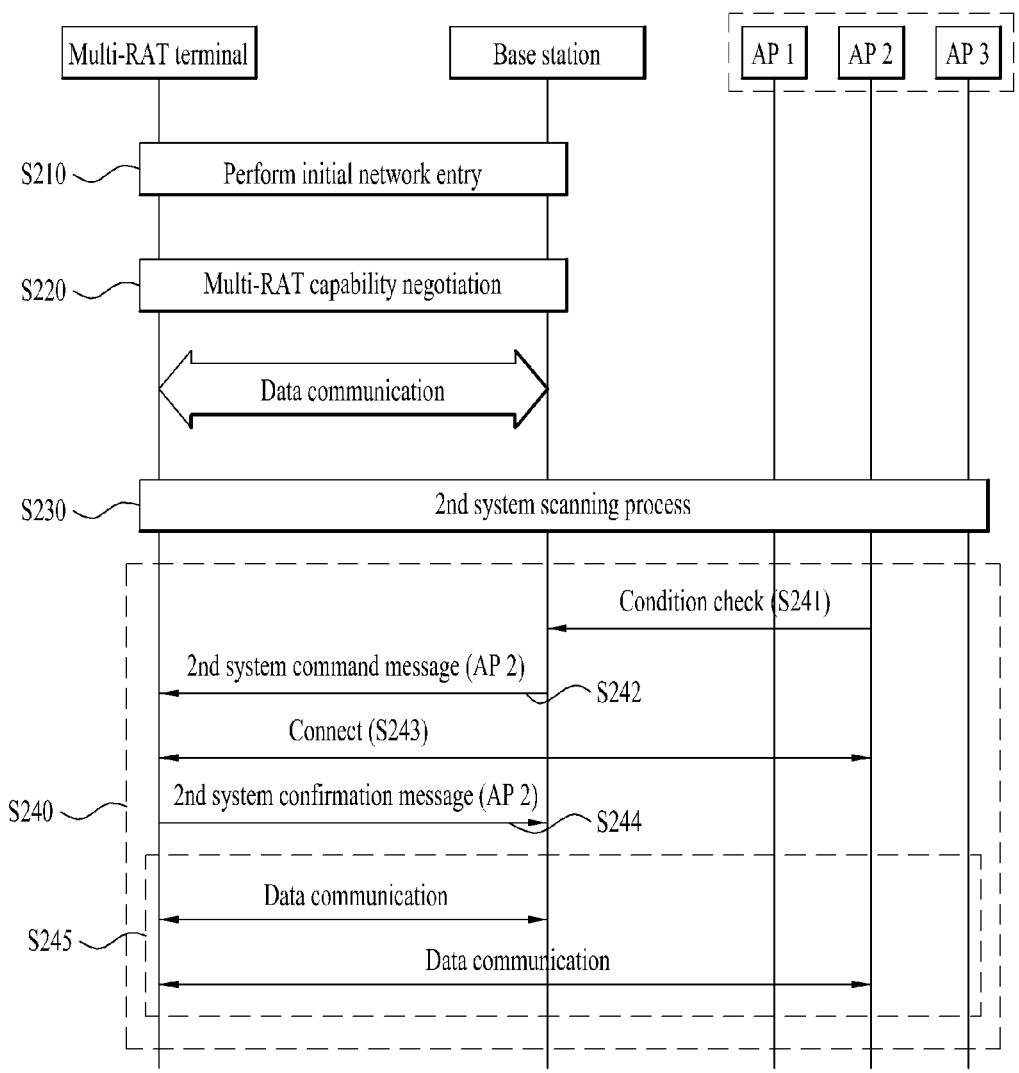
FIG. 5 is a flowchart of a process for adding a $2^{nd}$ system in a $2^{nd}$ system operating method, i.e., a process for a multi-RAT terminal to access the $2^{nd}$ system.

FIG. 5 is a flowchart of a process for adding a $2^{nd}$ system in a $2^{nd}$ system operating method, i.e., a process for a multi-RAT terminal to access the $2^{nd}$ system.

Since contents of the steps S210 to S230 are identical to those of the former steps shown in FIG. 2, the corresponding details shall be omitted from the following description. Yet, the different step S240 shall be described in detail as follows.

First of all, for the access to the $2^{nd}$ system, the multi-RAT terminal or the base station can make a multi-RAT access request. In doing so, the multi-RAT access request process can be performed using a $2^{nd}$ system access request message and a $2^{nd}$ system access response message.

In case that the $2^{nd}$ system is added in response to a request made by the multi-RAT terminal, if the multi-RAT terminal detects the $2^{nd}$ system, which meets a specific condition, by performing a scanning, the multi-RAT terminal can make a request for a connection to the $2^{nd}$ system to the base station by sending a $2^{nd}$ system request message to the base station.

On the other hand, in case that the $2^{nd}$ system is added in response to a request made by the base station, if the base station detects that a specific flow connection to the multi-RAT terminal is created, the base station checks a state of an AP accessible to the multi-RAT terminal [S241].

As a result of the check, if the access to the multi-RAT terminal is possible, the base station sends a $2^{nd}$ system command message to the multi-RAT terminal, thereby instructing a connection between the multi-RAT terminal and the $2^{nd}$ system [S242].

In doing so, a control for the multi-RAT terminal to access multi-RAT, i.e., a transmission of a control information, is performed by the base station of the $1^{st}$ system. This enables the multi-RAT terminal to transceive data with the $2^{nd}$ system only, thereby enabling QoS for the corresponding data to follow a protocol supported by the $1^{st}$ system as it is. In doing so, the transmission of the control information can be performed using a $2^{nd}$ system access command message.

In this case, the $2^{nd}$ system access command message may include information on a selected AP, information on a flow transmitted to the $2^{nd}$ system, authentication mechanism (e.g., open system, shared key, etc.) and the like. In FIG. 5, it can be observed that the selected AP information is AP 2.

Subsequently, the multi-RAT terminal completes an access to a specific AP and a traffic stream (TS) configuration with reference to the AP information in the $2^{nd}$ system command message by the command for the access to the $2^{nd}$ system from the base station [S243]. For instance, ADDTS request/response process of 802.11e can be performed.

Subsequently, the multi-RAT terminal informs the base station of a result of the successful access to the AP [S244].

In FIG. 5, it can be observed that the multi-RAT terminal informs the base station of the successful access to the AP 2.

In doing so, such an operation can be performed via a $2^{nd}$ system indication (SS_IND) message. In particular, the $2^{nd}$ system indication message can include a mapping result between FID (flow ID) and AID/TSID (association ID/traffic stream ID) for the corresponding flow.

Thereafter, the multi-RAT terminal transceives data for the specific flow via the $2^{nd}$ system. In particular, the multi-RAT terminal simultaneously transceives data with the $1^{st}$ system and the $2^{nd}$ system in accordance with a data flow [S245].

In particular, in case of DL data, the base station transmits the DL data to the multi-RAT terminal via the AP.

And, in case of UL data, data for a specific flow ID indicated by the base station is transmitted via WLAN for example of the $2^{nd}$ system.

The multi-RAT terminal can perform a reconnection to an AP or a release of the connection by transceiving the $2^{nd}$ system command message and the $2^{nd}$ system indication message with the base station.

While the multi-RAT terminal is transceiving data with the AP, when the multi-RAT terminal leaves a coverage of the $2^{nd}$ system (e.g., WLAN), if there is no AP around the multi-RAT terminal, the base station can control a seamless flow mobility between the AP and the base station in order for the data currently transceived with the AP to be transmitted seamlessly.

While the multi-RAT terminal is transceiving data with an AP of the $2^{nd}$ system, if the multi-RAT terminal detects a neighbor AP, the base station can control the data, which are currently transceived by the multi-RAT terminal, to be seamlessly transceived between the AP and the neighbor AP.

In the following description, a method of removing a $2^{nd}$ system (or releasing the connection to a $2^{nd}$ system) is explained.

First of all, if a multi-RAT terminal determines that a state of a channel with a currently accessed $2^{nd}$ system is not good, the multi-RAT terminal performs a scanning on neighbor $2^{nd}$ systems. In doing so, as mentioned in the foregoing description, the scanning can be performed in response to a base station indication or by the multi-RAT terminal with its own determination.

As a result of the neighbor $2^{nd}$ system scanning, if the multi-RAT terminal determines that no $2^{nd}$ systems are detected, the multi-RAT terminal releases the connection to the currently accessed $2^{nd}$ system.

In doing so, if data corresponding to a random flow of a $1^{st}$ system are being transceived via the $2^{nd}$ system and the terminal is unable to perform a handover (HO) into a neighbor secondary system, a base station should support multi-RAT seamless flow mobility to enable seamless flow mobility without data loss of the corresponding flow.

Alternatively, in doing so, if the multi-RAT terminal completes the transmission of the data transceived with the $2^{nd}$ system, the base station can release the connection to the $2^{nd}$ system.

In the following description, a change of a $2^{nd}$ system (e.g., a handover into a neighbor AP) is explained.

In this case, the change of the $2^{nd}$ system, i.e., the handover between $2^{nd}$ systems, can be assumed as performed on a specific connection only.

In this case, the change of the $2^{nd}$ system can be performed in a manner of enabling a seamless handover between $2^{nd}$ systems via a $1^{st}$ system.

In case that a multi-RAT terminal or a base station determines that a channel state of a $2^{nd}$ system currently accessed by the multi-RAT terminal is not good, the base station releases a connection from the currently accessed $2^{nd}$ system and is able to request a handover (HO) into another $2^{nd}$ system.

In particular, the base station sends SS-CMD message to the multi-RAT terminal, thereby informing the multi-RAT terminal that there is not further data transceiving via a current serving secondary system. Subsequently, the base station instructs the multi-RAT terminal to transceive the previously transceived data via the $1^{st}$ system. If the transmission of the previous data is completed, the base station instructs the multi-RAT terminal to transceive data with a new $2^{nd}$ system. In particular, a seamless handover between $2^{nd}$ systems can be performed via the $1^{st}$ system.

When a multi-RAT terminal performs a handover between $1^{st}$ systems, if a coverage of a $2^{nd}$ system lies over a boundary between the $1^{st}$ systems, the multi-RAT terminal can perform the handover between the $1^{st}$ systems seamlessly using the $2^{nd}$ system.

In case that a multi-RAT terminal is moving in a coverage of WiMAX, which is one example of a $1^{st}$ system, with a fast moving speed, even if the multi-RAT terminal enters a coverage of a $2^{nd}$ system, a base station can instruct the multi-RAT terminal not to perform an access to the $2^{nd}$ system. In particular, such a management of the $2^{nd}$ system can be performed based on a speed of the multi-RAT terminal In the following description, a process for a multi-RAT terminal to perform a connection to a $2^{nd}$ system, a reconnection to the $2^{nd}$ system and a connection release is explained in detail with reference to FIGS. 6 to 8.

Figure 6:
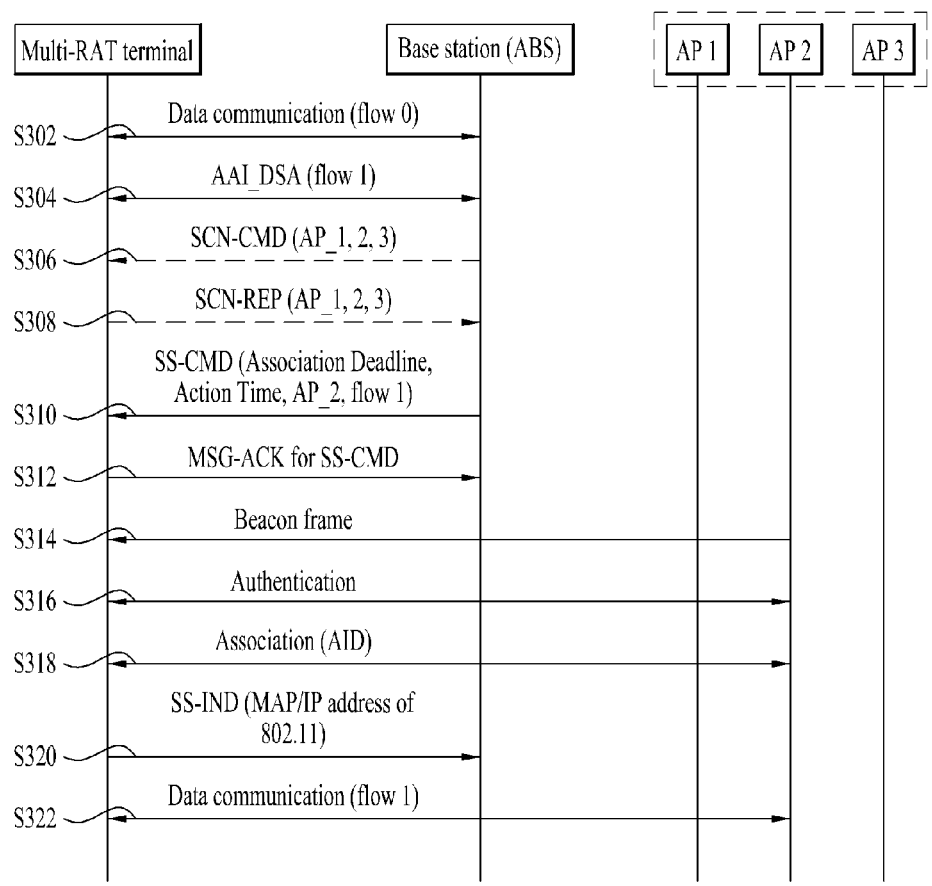
FIG. 6 is a flowchart of a process for connecting a multi-RAT terminal to a $2^{nd}$ system.

FIG. 6 is a flowchart of a process for connecting a multi-RAT terminal to a $2^{nd}$ system.

Referring to FIG. 6, a multi-RAT terminal performs a data communication for a flow 0 with a base station [S302]. Subsequently, the multi-RAT terminal performs a data communication for a flow 1 with the base station through AAI_DSA [S304]. The multi-RAT terminal receives a scan command message from the base station [S306], scans neighbor APs, and then sends a scan report message to the base station [S308]. In this case, the base station determines a configuration of a connection between the multi-RAT terminal and a specific AP based on the san report message.

A control for the connection to the AP is performed via the base station [S310]. In doing so, the multi-RAT terminal can make a request for the connection to the AP to the base station (e.g., SS-REQ) (not shown in the drawing). In doing so, a selected AP, information on a flow transmitted to a $2^{nd}$ system and an authentication method (e.g., open system, shared key, etc.) are transmitted to the multi-RAT terminal from the base station. Moreover, whether to enter a doze mode can be included in SS-CMD. For power saving, the base station can indicate the entry of the multi-RAT terminal into the doze mode. And, as a time (association deadline) for the multi-RAT terminal to perform synchronization, authentication and connection with the AP and a value after the association deadline, an action time, which means that the data transceiving with the $2^{nd}$ system is possible from the corresponding time after the reception of SS-IND message, can be further included in the SS-CMD.

Subsequently, the multi-RAT terminal sends a message, which indicates that the SS-CMD has been received correctly, to the base station [S312], performs the synchronization with an AP by receiving a beacon frame from the corresponding AP indicated by the SS-CMD [S314], performs an authentication procedure using the open system or the shared key [S316], and then receives an assignment of AID by performing a connection through a connection request/response transceiving with the corresponding AP [S318].

The multi-RAT terminal informs the base station of the successful connection to the AP [S320]. In doing so, the multi-RAT terminal transmits a mapping result of FID (flow ID) for a corresponding flow and AID/TSID (association ID/traffic stream ID) and an IP address assigned by the AP to the base station. If the multi-RAT terminal establishes the connection to the AP without instruction or indication of the base station, the multi-RAT terminal should inform the base station of the connection establishment. To this end, the multi-RAT terminal can send SS_IND message to the base station without request.

Finally, the multi-RAT terminal can transceive data for the specific flow via the $2^{nd}$ system [S322].

Figure 7:
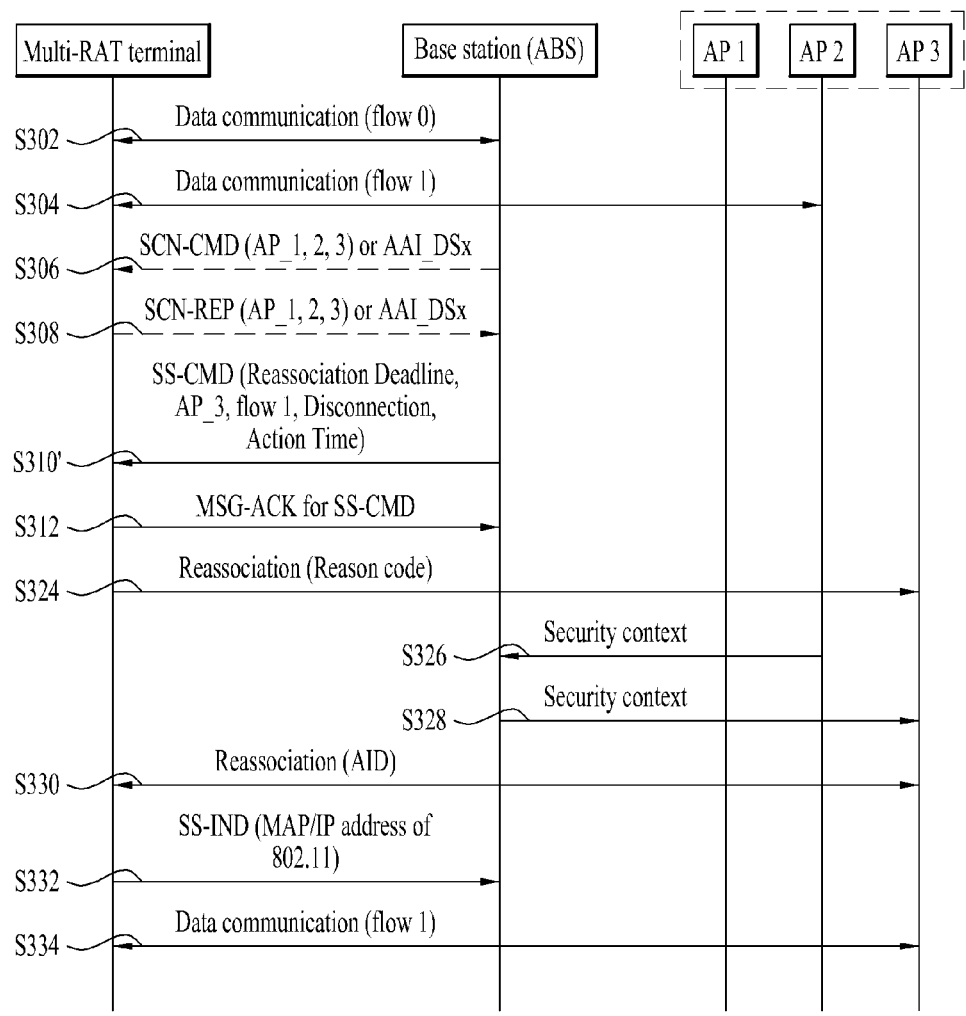
FIG. 7 is a flowchart of a process for reconnecting a multi-RAT terminal to a $2n^d$ system.

FIG. 7 is a flowchart of a process for reconnecting a multi-RAT terminal to a $2^{nd}$ system.

Referring to FIG. 7, a multi-RAT terminal performs a data communication for a flow 0 with a base station [S302]. Subsequently, the multi-RAT terminal performs a data communication for a flow 1 with the base station through AAI_DSA [S304]. The multi-RAT terminal receives a scan command message from the base station [S306], scans neighbor APs, and then sends a scan report message to the base station [S308]. In this case, the base station determines a reconnection configuration (handover) to a specific AP from an AP connected to the multi-RAT terminal based on the san report message.

The base station sends an SS_CMD message for the reconnection to an AP to the multi-RAT terminal [S310']. In the SS-CMD message, information on a newly selected AP and a flow to be transmitted to a $2^{nd}$ system, a shared key information and the like can be included. Moreover, in the SS_CMD message, information indicating whether the multi-RAT terminal enters a doze mode after the reconnection, a reconnection (association) deadline, a disconnection time, an action time and the like can be further included. In this case, the multi-RAT terminal releases a connection from a previous AP at the disconnection time and is then able to initiate a communication with the newly selected AP at the actin time. Moreover, this value should be a value after a reassociation deadline. The multi-RAT terminal sends an acknowledgement message, which indicates that the SS_CMD message has been correctly received, to the base station [S312].

Subsequently, the multi-RAT terminal releases the connection from the previous AP at the disconnection time and initiates the communication with the newly selected AT [S324 to S330]. In particular, the multi-RAT terminal performs a reconnection to (or a reassociation with) the new AP. This process is performed in a manner that the multi-RAT terminal transceives a reconnection request and a reconnection response with the new AP. In case of the reconnection request, if the multi-RAT terminal informs the new AP of an address of the previous AP, the authentication process can be omitted [S326, S328]. The multi-RAT terminal receives an AID through the reconnection response.

The multi-RAT terminal informs the base station of a successful connection to the new AP and a corresponding result [S332]. In doing so, a mapping result of FID (flow ID) for a corresponding flow and AID/TSID (association ID/traffic stream ID) and an IP address assigned by the new AP are transmitted. If the multi-RAT terminal establishes the reconnection to (or reassociation with) the AP without instruction or indication of the base station, the multi-RAT terminal should inform the base station of the reconnection (reassociation) establishment. To this end, the multi-RAT terminal can send SS_IND message to the base station without request.

Finally, the multi-RAT terminal can transceive data for the specific flow via the new AP from the action time [S334].

Figure 8:
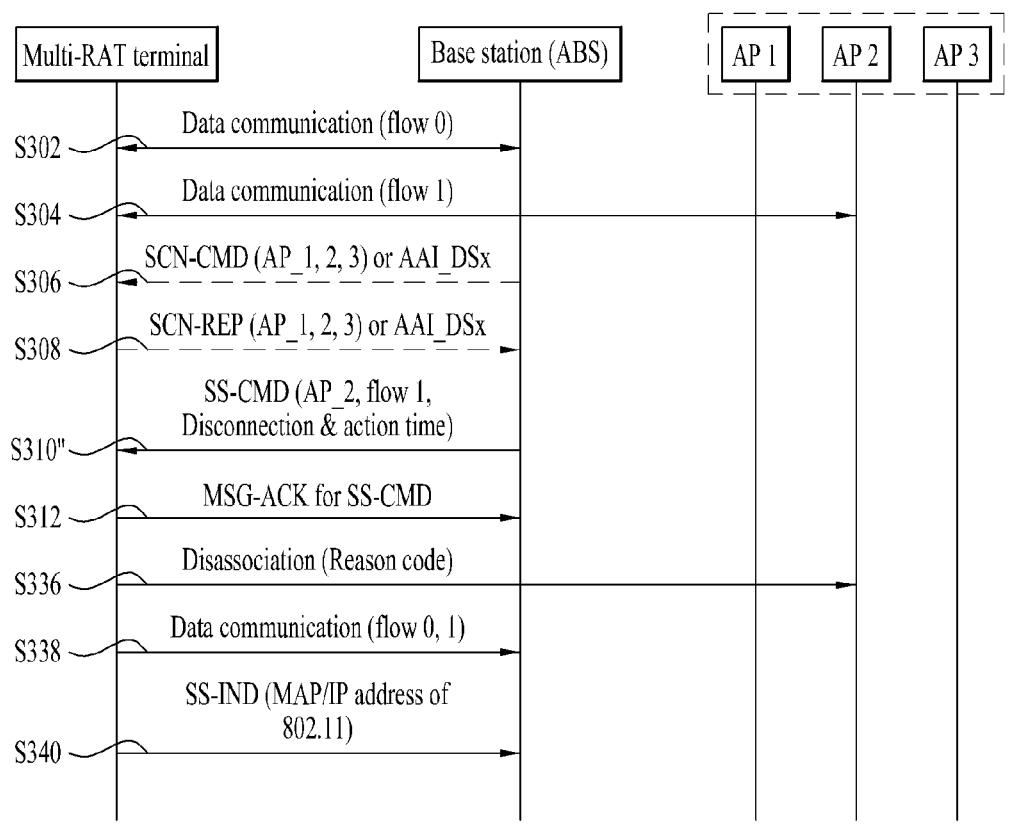
FIG. 8 is a flowchart of a process for a multi-RAT terminal to release a connection from a $2^{nd}$ system.

FIG. 8 is a flowchart of a process for a multi-RAT terminal to release a connection from a $2^{nd}$ system.

Referring to FIG. 8, a multi-RAT terminal performs a data communication for a flow 0 with a base station [S302]. Subsequently, the multi-RAT terminal performs a data communication for a flow 1 with the base station through AAI_DSA [S304]. The multi-RAT terminal receives a scan command message from the base station [S306], scans neighbor APs, and then sends a scan report message to the base station [S308]. In this case, the base station determines a release of the connection from the AP connected to the multi-RAT terminal based on the san report message.

The multi-RAT terminal receives an SS_CMD message for disassociation from the AP from the base station [S310"]. In the SS_CMD message, an AP to be disassociated and a disconnection time (and an action time) are included. The multi-RAT terminal releases the connection from the previous AP at the disconnection time and can initiate a communication with the base station at the action time. The multi-RAT terminal sends an acknowledgement message, which indicates that the SS_CMD message has been correctly received, to the base station [S312].

Subsequently, the multi-RAT terminal transmits a disassociation indication frame to the current AP at the disconnection time [S336]. The multi-RAT terminal informs the base station of a successful disassociation from the APT to the base station [S340]. If the multi-RAT terminal completes the disassociation from the AP, without instruction or indication of the base station, the multi-RAT terminal should inform the base station of the disassociation. To this end, the multi-RAT terminal can send SS_IND message to the base station without request.

Finally, the multi-RAT terminal can transceive data for the specific flow via the base station again from the action time [S338].

Description for Embodiments Disclosed in Specification

In the following description, a method for a multi-RAT terminal to transceive data with a $1^{st}$ system and a $2^{nd}$ system by transmitting properties of a flow preferring a communication with a specific system according the present specification is explained in detail.

In the following description, QoS class can be used as having the same meaning of multi-RAT flow class or multi-RAT QoS class.

Figure 9:
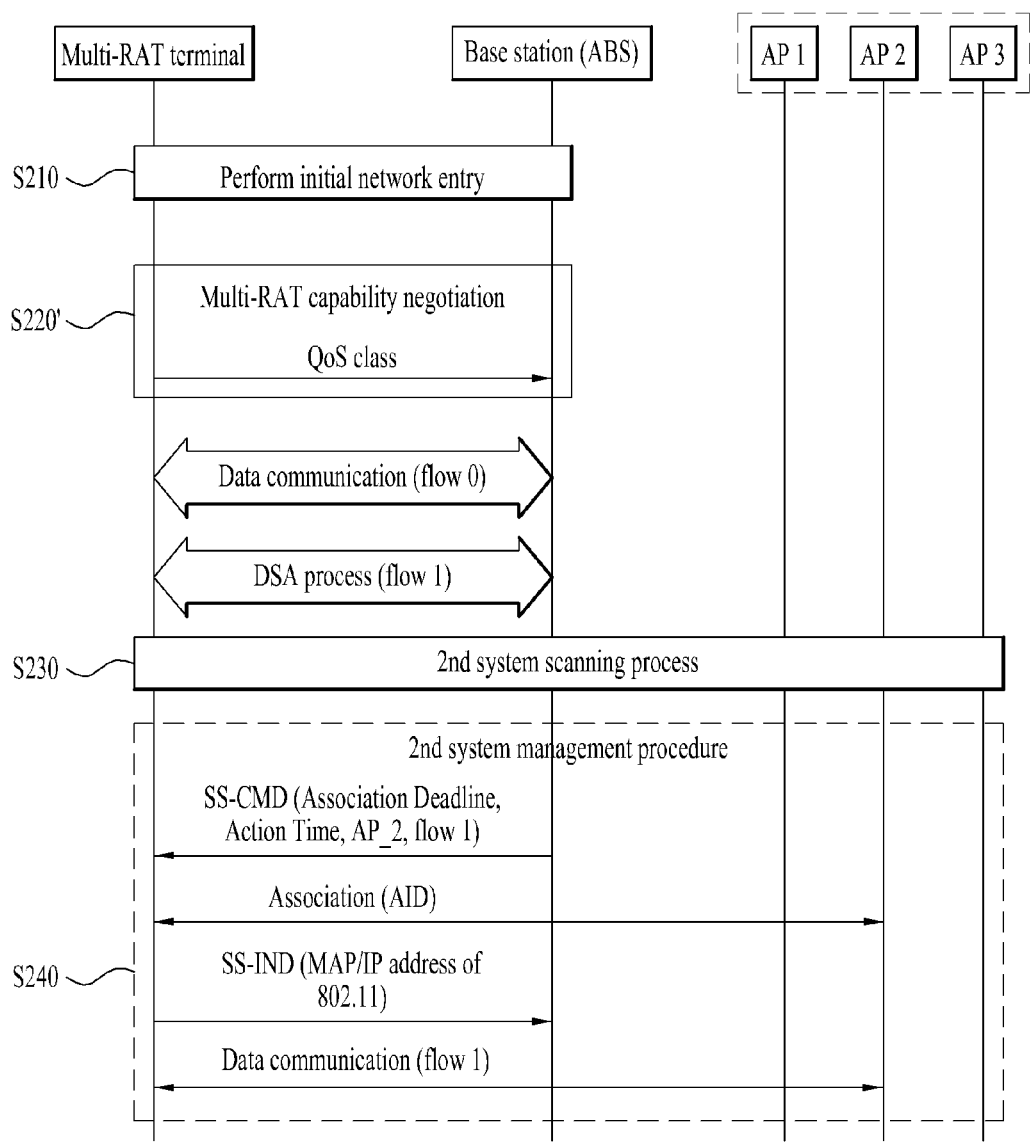
FIG. 9 is a flowchart of a method for a multi-RAT terminal to transceive data via a $1^{st}$ system and a $2^{nd}$ system according to embodiments of the present specification.

FIG. 9 is a flowchart of a method for a multi-RAT terminal to transceive data via a $1^{st}$ system and a $2^{nd}$ system according to embodiments of the present specification.

Referring to FIG. 9, a multi-RAT terminal performs an initial network entry process with a base station ABS [S210]. In this case, the multi-RAT terminal can inform the base station that it supports multi-RAT through the initial network entry process. And, the base station can inform the multi-RAT terminal that it supports multi-RAT through the initial network entry process. The information indicating that the multi-RAT terminal or the base station supports the multi-RAT can be transmitted via a registration request/response (REG-REQ/RSP) message.

For an access to an AP, the multi-RAT terminal performs a multi-RAT capability negotiation process with the base station ABS [S220']. In doing so, the multi-RAT terminal transmits a control information, which indicates a property (e.g., QoS class type) for a specific flow preferring to transceive data via an AP, to the base station. In this case, the control information can be transmitted through a multi-system request message.

The control information can include a QoS parameter or class. For instance, if the control information indicates 'latency>10 ms', it can instruct a traffic to be shifted to a $2^{nd}$ system for a flow of which latency exceeds 10 ms. Moreover, for instance, if the control information indicates a class including 'BE', it can instruct a traffic to be shifted to the $2^{nd}$ system for a traffic requiring a best effort service.

The multi-RAT terminal can transceive data for a service flow '0' with the base station. Subsequently, the multi-RAT terminal and the base station can newly create a service flow '1' that requires a latency equal to or smaller than 10 ms through a dynamic service adding process. The multi-RAT terminal then transceives data, which corresponds to the service flow 1' newly created through the steps S230 and S240, with the AP.

The step S240 is described in detail as follows. First of all, the base station sends a $2^{nd}$ system command message (SS-CMD), which instructs the multi-RAT terminal to access an AP 2 and transceive data with the AP 2 for the service flow '1', to the multi-RAT terminal In this case, the information, which indicates the data transceiving with the AP 2 for the service flow '1', included in the SS-CMD message means the confirmation of the control information transmitted to the base station by the multi-RAT terminal Thereafter, the multi-RAT terminal performs the access to the AP 2 and then sends the base station a $2^{nd}$ system confirmation message (SS-IND) indicating that the multi-RAT terminal is connected to the AP 2. In case of data corresponding to the service flow '0', the multi-RAT terminal communicates with the base station. In case of data corresponding to the service flow '1', the multi-RAT terminal communicates with the AP 2.

As mentioned in the foregoing description, the multi-RAT terminal can transmit a property (e.g., QoS class type) for a flow preferred to be transmitted to a specific system to the base station through a multi-RAT capability request MAC control message. And, the base station can inform the multi-RAT terminal of a confirmation or modification of the property through a multi-RAT capability response MAC control message. For instance, the property of the flow preferred to be transmitted to the specific system can be defined using the parameters shown in Table 2.

TABLE 2

| Parameter | Remarks |
| --- | --- |
| UL/DL indicator | |
| Sustained traffic rate per flow | |
| Traffic burst | |
| Reserved traffic rate | |
| Latency | |
| UL grant scheduling type | Undefined/BE/nrtPS/rtPS/ertPS/UGS/GP service |

In this case, parameters shown in Table 3 can be defined for the UL grant scheduling type.

TABLE 3

| Parameter | UL grant scheduling type |
| --- | --- |
| Allowable jitter | ertPS, aGP service or UGS |
| Traffic priority | rtPS, ertPS, nrtPS, aGP service or BE |
| Unrequested grant interval | ertPS or UGS |
| Unrequested polling interval | rtPS |

TABLE 3-continued

| Parameter | UL grant scheduling type |
| --- | --- |
| Main GPI | aGP service |
| Main grant size | aGP service |
| Auxiliary GPI | aGP service |
| Auxiliary grant size | aGP service |
| Application method | aGP service |

1st Embodiment

According to a 1st embodiment disclosed in the present specification, QoS parameter for a flow preferring a specific system is defined in multi-RAT capability negotiation request/response MAC control message. A multi-RAT terminal/base station can set up a value, which is preferred by the multi-RAT terminal/base station, for the defined QoS parameter. If the preferred value is not set up, it can be set to a default value. If a specific flow is created and the multi-RAT terminal enters a coverage of a 2nd system, the base station compares the value requested by the multi-RAT terminal to a QoS parameter value of the corresponding flow. If the comparison is satisfied, the base station can instruct the multi-RAT terminal to redirect (or switch) the corresponding traffic to the 2nd system. In doing so, the value-compared parameters can include parameters defined in Table 4 for UL and DL, respectively.

TABLE 4

| UL | DL |
| --- | --- |
| Sustained traffic rate per flow | Sustained traffic rate per flow |
| Traffic burst | Traffic burst |
| Reserved traffic rate | Reserved traffic rate |
| Latency | Latency |
|  | UL grant scheduling type definition |

For instance, the UL grant scheduling type can include at least one of undefined, BE and nrtPS services.

2nd Embodiment

According to a 2nd embodiment disclosed in the present specification, after QoS class has been defined in accordance with QoS parameter value, a multi-RAT terminal/base station announces a specific class preferred (or set) to communicate via a 2nd system using a multi-RAT request/response MAC control message.

In this case, a parameter for each class can be defined in advance. In particular, the parameter can be broadcasted per base station (per AP or version (e.g., 802.11a, 802.11g, 802.11n) of AP) or may be predefined in the standard. And, a value for the corresponding parameter may vary depending on service provider's settings.

The multi-RAT terminal or the base station selects a class preferred by itself and then informs the base station of the selected class, in the course of a multi-RAT capability negotiation. In this case, the QoS class is defined step by step and a class n−1 is regarded as including all parameters of class n (where, n is an integer equal to or greater than 1).

Figure 10:
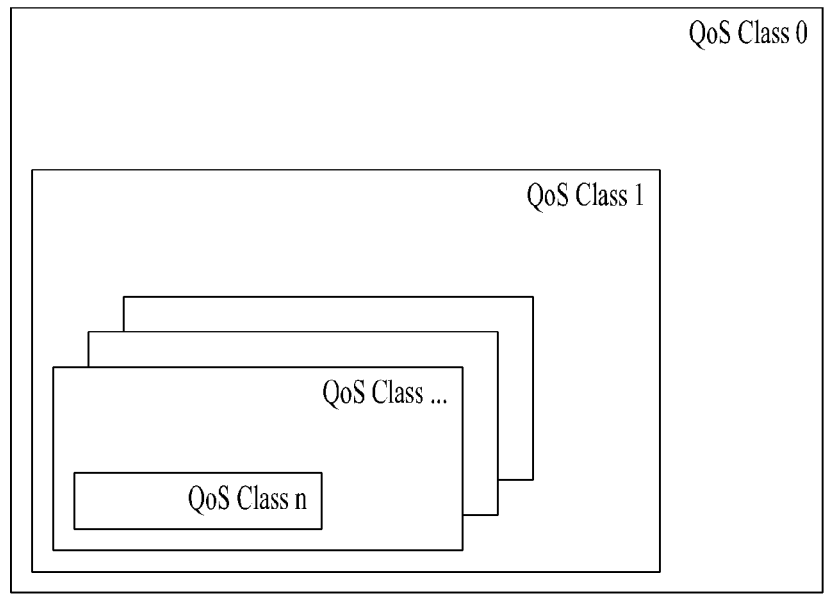
FIG. 10 is a diagram for QoS class definition according to a $2^{nd}$ embodiment disclosed in the present specification.

FIG. 10 is a diagram for QoS class definition according to a 2nd embodiment disclosed in the present specification.

Referring to FIG. 10, if QoS class is 0, it indicates 'undefined' and all traffics can be switched to a 2nd system under the determination made by a base station. If QoS class is 1, it indicates 'BE'. If there is a traffic that requires a best effort service, a switching to the 2nd system can be preferred (other traffics may be switchable under the determination made by the base station). If QoS class is n, it indicates nrtPS. If there is a traffic that requires a minimum non-real time polling service, a switching to the 2nd system can be preferred (other traffics may be switchable under the determination made by the base station).

3rd Embodiment

According to a 3rd embodiment disclosed in the present specification, after QoS class has been defined in accordance with QoS parameter value, a multi-RAT terminal/base station announces a specific class preferred (or set) to communicate via a 1st system using a multi-RAT request/response MAC control message.

In this case, a parameter for each class can be defined in advance. In particular, the parameter can be broadcasted per base station (per AP or version (e.g., 802.11a, 802.11g, 802.11n) of AP) or may be predefined in the standard. And, a value for the corresponding parameter may vary depending on service provider's settings.

The multi-RAT terminal and the base station select a class preferred by itself and then informs the base station of the selected class, in the course of a multi-RAT capability negotiation. In this case, the QoS class is defined step by step and a class n−1 is regarded as including all parameters of class n (where, n is an integer equal to or greater than 1).

Figure 11:
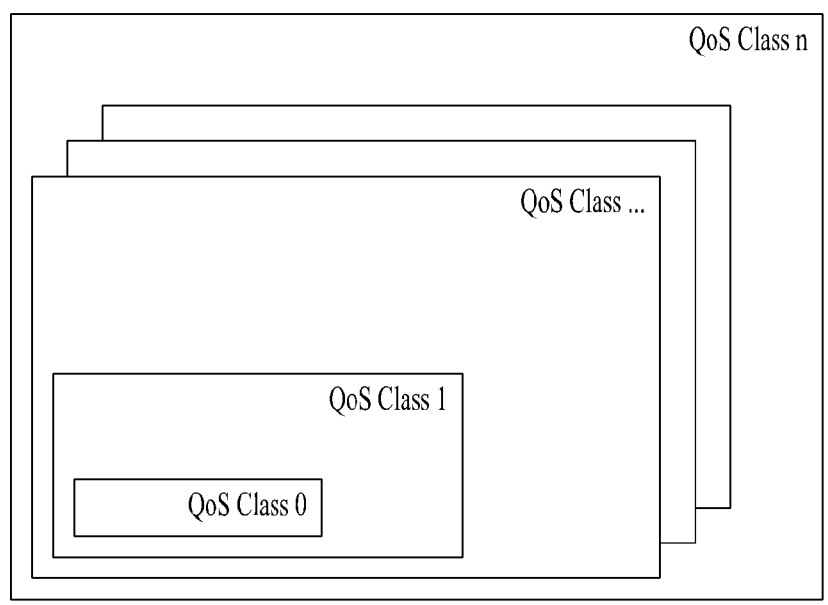
FIG. 11 is a diagram for QoS class definition according to a $3^{rd}$ embodiment disclosed in the present specification.

FIG. 11 is a diagram for QoS class definition according to a 3rd embodiment disclosed in the present specification.

Referring to FIG. 11, if QoS class is 0, it indicates rtPS and a traffic requiring a real time polling service is guided to communicate via a 1st system. If QoS class is 1, it indicates rtPS and ertPS and a traffic requiring a real time polling service or an extended real time polling service is guided to communicate via the 1st system. If QoS class is n, traffics requiring QoS classes set to 0 to n−1 and a BE service are guided to communicate via the 1st system. In particular, according to the 3rd embodiment, if a specific class is selected, only a traffic undefined in the selected class can be switched to a 2nd system.

4th Embodiment

According to a 4th embodiment disclosed in the present specification, after QoS class has been defined in accordance with QoS parameter value, a multi-RAT terminal/base station announces a sequence preferred (or set) to communicate via a 2nd system (or a 1st system) using a defined QoS class through a multi-RAT request/response MAC control message.

Figure 12:
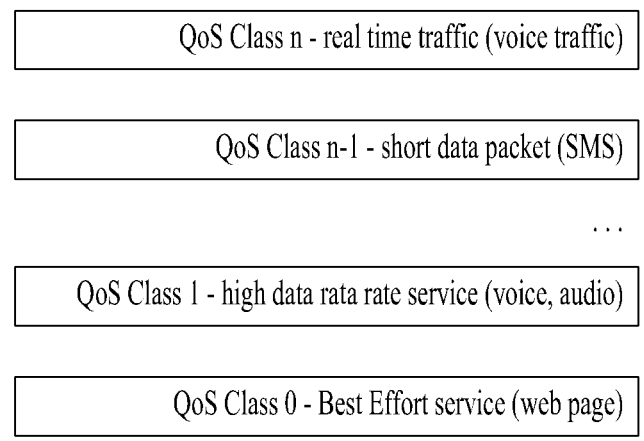
FIG. 12 is a diagram for QoS class definition according to a $4^{th}$ embodiment disclosed in the present specification.

FIG. 12 is a diagram for QoS class definition according to a 4th embodiment disclosed in the present specification.

For instance, a multi-RAT terminal sends a multi-RAT request message in a manner that 'QoS class 0, QoS class 1 and QoS class n−1' are contained in the multi-RAT request message. A base station then receives the message. When the multi-RAT terminal enters a coverage of a 2nd system, if traffics for the QoS classes 0, 1 and n−1 exist, a base station having received the message controls the data flow for the corresponding traffics to be transmitted by switching to the 2nd system if possible. If the 2nd system is unable to receive all traffics, a switching can be performed in order to transmit the traffics via the 2nd system in order of 0, 1 and n−1. Each of the QoS classes shown in FIG. 12 can be independently defined.

5th Embodiment

According to a 5th embodiment disclosed in the present specification, after QoS class has been defined in accordance with QoS parameter value, a multi-RAT terminal/base station announces a specific class preferred (or set) to communicate via a 2nd system using a multi-RAT request/response MAC control message.

In this case, a parameter for each class can be defined in advance. In particular, the parameter can be broadcasted per base station (per AP or version (e.g., 802.11a, 802.11g, 802.11n) of AP) or may be predefined in the standard. And, a value for the corresponding parameter may vary depending on service provider's settings.

The multi-RAT terminal or the base station selects a class preferred by itself and then informs the base station of the selected class, in the course of a multi-RAT capability negotiation. In this case, like the $2^{nd}$ embodiment, a class 1 belongs to a class n−1. Yet, unlike the $2^{nd}$ embodiment, a class set to an independent parameter value such as a class n+1 can exist.

Figure 13:
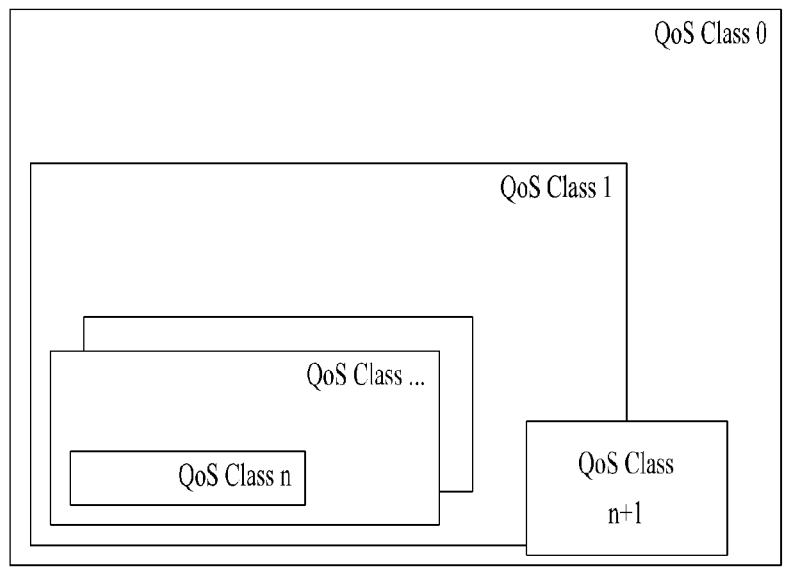
FIG. 13 is a diagram for QoS class definition according to a $5^{th}$ embodiment disclosed in the present specification.

FIG. 13 is a diagram for QoS class definition according to a $5^{th}$ embodiment disclosed in the present specification.

Referring to FIG. 13, if QoS class is 0, it indicates 'undefined' and all traffics can be switched to a $2^{nd}$ system under the determination made by a base station. If QoS class is 1, it indicates 'BE'. If there is a traffic that requires a best effort service, a switching to a $2^{nd}$ system can be preferred (other traffics may be switchable under the determination made by the base station). If QoS class is n, it indicates nrtPS. If there is a traffic that requires a minimum non-real time polling service, a switching to the $2^{nd}$ system can be preferred (other traffics may be switchable under the determination made by the base station).

Moreover, if QoS class is n+1, it indicates BE or nrtPS. If there is a traffic that requires a best effort service or a minimum non-real time polling service, a switching to the $2^{nd}$ system can be preferred (other traffics may be switchable under the determination made by the base station).

$6^{th}$ Embodiment

According to a $6^{th}$ embodiment disclosed in the present specification, after QoS class has been defined in accordance with QoS parameter value, a multi-RAT terminal/base station announces a specific class preferred (or set) to communicate via a $1^{st}$ system using a multi-RAT request/response MAC control message.

In this case, a parameter for each class can be defined in advance. In particular, the parameter can be broadcasted per base station (per AP or version (e.g., 802.11a, 802.11g, 802.11n) of AP) or may be predefined in the standard. And, a value for the corresponding parameter may vary depending on service provider's settings.

The multi-RAT terminal or the base station selects a class preferred by itself and then informs the base station of the selected class, in the course of a multi-RAT capability negotiation. In this case, like the $3^{rd}$ embodiment, a class n−1 belongs to a class n. Yet, unlike the $3^{rd}$ embodiment, a class set to an independent parameter value such as a class n+1 can exist.

Figure 14:
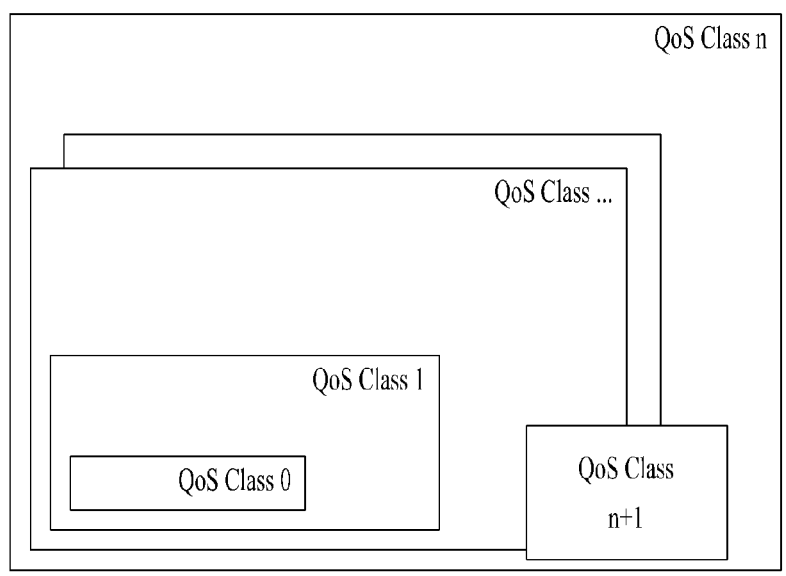
FIG. 14 is a diagram for QoS class definition according to a $6^{th}$ embodiment disclosed in the present specification.

FIG. 14 is a diagram for QoS class definition according to a $6^{th}$ embodiment disclosed in the present specification.

Referring to FIG. 14, if QoS class is 0, it indicates rtPS and a traffic requiring a real time polling service is guided to communicate via a $1s^t$ system. If QoS class is 1, it indicates rtPS and ertPS and a traffic requiring a real time polling service or an extended real time polling service is guided to communicate via the $1s^t$ system. If QoS class is n, traffics requiring QoS classes set to 0 to n−1 and a BE service are guided to communicate via the $1^{st}$ system. In particular, according to the $6^{th}$ embodiment, if a specific class is selected, only a traffic undefined in the selected class can be switched to a $2^{nd}$ system.

Moreover, if QoS class is n+1, it indicates rtPS. If there is a traffic that requires a real time polling service, a switching to the $1^{st}$ system can be preferred (other traffics may be switchable under the determination made by the base station).

$7^{th}$ Embodiment

According to a $7^{th}$ embodiment disclosed in the present specification, a multi-RAT flow class for a flow preferred (or set) to communicate via a $2^{nd}$ system can be defined in BS broadcast message such as SFH message, NBR-ADV message and SCD message.

A base station can offload traffics of a terminal into a $2^{nd}$ system in accordance with the multi-RAT flow class. On the other hand, if a terminal does not want to follow the definition of the multi-RAT flow class determined by the base station, the corresponding terminal can redefine a priority for a unique multi-RAT flow class of its own and is then able to offload traffics in accordance with the multi-RAT flow class defined by the terminal in a manner of informing the base station of the value of redefined priority by unicast.

Figure 15:
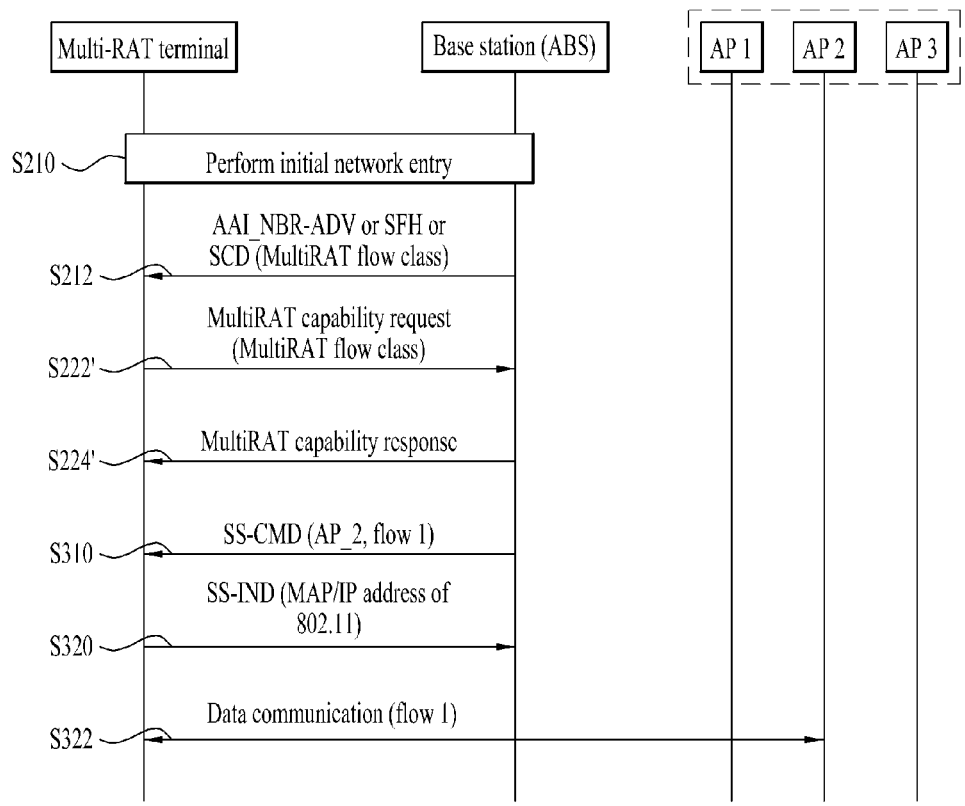
FIG. 15 is a flowchart of a method for a multi-RAT terminal to transceive data via a $1^{st}$ system and a $2^{nd}$ system according to a $7^{th}$ embodiment of the present specification.

FIG. 15 is a flowchart of a method for a multi-RAT terminal to transceive data via a $1^{st}$ system and a $2^{nd}$ system according to a $7^{th}$ embodiment of the present specification.

Referring to FIG. 15, a multi-RAT terminal performs an initial network entry process with a base station ABS [S210]. In this case, the multi-RAT terminal can inform the base station that it supports multi-RAT through the initial network entry process. And, the base station can inform the multi-RAT terminal that it supports multi-RAT through the initial network entry process. The information indicating that the multi-RAT terminal or the base station supports the multi-RAT can be transmitted via a registration request/response (REG-REQ/RSP) message.

The base station (or a service provider) defines a property of a flow preferred to offload into a $2^{nd}$ system as a multi-RAT flow class. And, the base station then transmits the defined multi-RAT flow class to the multi-RAT terminal via a BS broadcast message [S212]. Having received the BS broadcast message, the multi-RAT terminal can predict a flow preferentially offloading into the $2^{nd}$ system by referring to the multi-RAT flow class defined by the base station.

If there is another multi-RAT flow class preferred by the multi-RAT terminal, the multi-RAT terminal updates the corresponding multi-RAT terminal and is then able to inform the base station of the updated multi-RAT flow class. To this end, a multi-RAT flow class MAC control message is newly defined or the multi-RAT flow class can be updated via a multi-RAT capability request MAC control message [S222']. Subsequently, the base station sends a multi-RAT capability response MAC control message to the multi-RAT terminal in response to the multi-RAT capability request MAC control message [S224'].

Having received a new multi-RAT flow, the base station prefers the multi-RAT flow class updated by the corresponding multi-RAT terminal for the corresponding multi-RAT terminal and then performs an offloading into the $2^{nd}$ system (cf. the base station prefers the multi-RAT flow class defined by the base station for another RAT terminal and then performs an offloading into the $2^{nd}$ system). In particular, the base station sends a $2^{nd}$ system command message (SS-CMD), which instructs the multi-RAT terminal to access an AP 2 and transceive data with the AP 2 for the service flow 1', to the multi-RAT terminal [S310].

Thereafter, the multi-RAT terminal performs the access to the AP 2 and then sends the base station a $2^{nd}$ system confirmation message (SS-IND) indicating that the multi-RAT terminal is connected to the AP 2. In case of data corresponding to the service flow '0', the multi-RAT terminal communicates with the base station. In case of data corresponding to the service flow 1', the multi-RAT terminal communicates with the AP 2 [S322].

The above-described embodiments and modified examples can be combined with each other. Hence, if necessary, each of the embodiments can be implemented by being combined with other embodiment(s) as well as implemented independently. It is apparent to those skilled in the art, who has read the present specification, that such a combination can be easily implemented. And, the corresponding combinations shall not be described in detail. The corresponding combinations should not be excluded from the present invention despite not being described but should be construed as included in the scope of the present invention.

Embodiments of the present invention can be implemented using various means. For instance, embodiments of the present invention can be implemented using hardware, firmware, software and/or any combinations thereof In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

For instance, a method according to the present invention can be saved in a storage medium (e.g., an internal memory, a flash memory, a hard disc, etc.) and can be implemented with codes or commands in a software program executable by a processor (e.g., a microprocessor). This is described with reference to FIG. 16 as follows.

Figure 16:
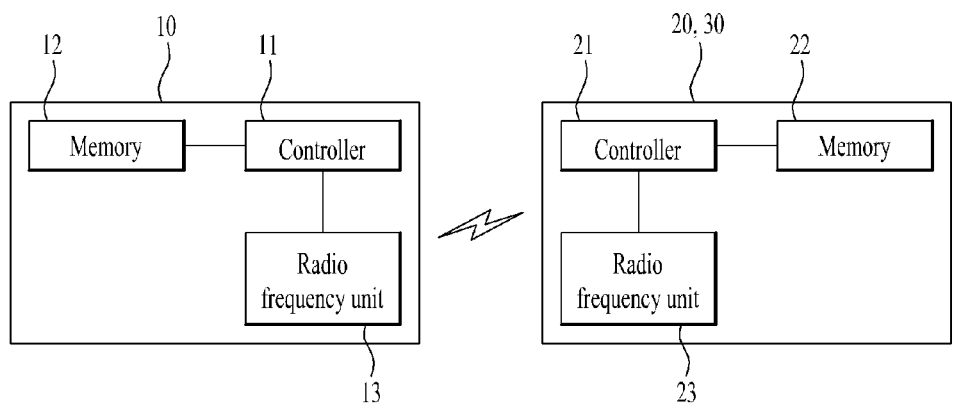
FIG. 16 is an internal block diagram of a terminal and a base station in a radio access system to which embodiments of the present specification are applicable.

FIG. 16 is an internal block diagram of a terminal and a base station in a radio access system to which embodiments of the present specification are applicable.

Referring to FIG. 16, a terminal 10 includes a controller 11, a memory 12 and a radio frequency (RF) unit 13.

The terminal 10 may be fixed or have mobility. And, the terminal 10 can be called a different terminology such as a user equipment (UE), a user terminal (UT), a subscriber station (SS), a wireless device, an advanced mobile station (AMS) and the like. And the terminal includes the multi-RAT terminal The terminal includes a display unit, a user interface unit and the like.

The controller 11 implements the proposed functions, processes and/or methods. Layers of a radio interface protocol can be implemented by the controller 11.

The memory 12 is connected to the controller 11 and then stores protocols and/or parameters for performing wireless communications. In particular, the memory 12 stores a terminal operating system, applications and general files.

The RF unit 13 is connected to the controller 11 and then transmits and/or receives radio signals.

In addition, the display unit displays various kinds of informations of the terminal. And, the display unit can be implemented using such a well-known component as an LCD (liquid crystal display), an OLED (organic light emitting diode) and the like. The user interface unit can be configured with a combination of well-known user interfaces including a keypad, a touchscreen and the like.

A base station 20/30 includes a controller 21, a memory 22 and a radio frequency (RF) unit 23.

In this case, the base station 20/30 means a fixed station communicating with a terminal in general and can be called such a terminology as a node B, a base transceiver system (BTS), an access point and the like. At least one cell may exist in one base station.

The controller 21 implements the proposed functions, processes and/or methods. Layers of a radio interface protocol can be implemented by the controller 21.

The memory 22 is connected to the controller 11 and then stores protocols and/or parameters for performing wireless communications.

The RF unit 23 is connected to the controller 11 and then transmits and/or receives radio signals.

The controller 11/21 may include ASIC (application-specific integrated circuit), a different chipset, a logical circuit, and/or a data processor. The memory 12/22 may include a read-only memory (ROM), a random access memory (RAM), a flash memory, a memory card, a storage medium and/or other storage devices. The RF unit 13/23 may include a baseband circuit for processing wireless signals. In case that an embodiment is implemented by software, the above-described schemes can be implemented with a module (e.g., process, function, etc.) for performing the above-mentioned functions. The module is saved in the memory 12/22 and can be activated by the controller 11/21/

The memory 12/22 may be located inside or outside the controller 11/21 and can be connected to the controller 11/21 via a well-known means.

A technical terminology used in this specification is used to describe a specific embodiment only, by which the present invention may be intentionally non-limited. A technical terminology used in this specification should be construed as a general meaning understandable by those skilled in the art to which the present invention pertains unless defined as a different meaning especially. And, a technical terminology used in this specification should not be construed as an excessively inclusive meaning or an excessively reduced meaning. When a technical terminology used in this specification is an incorrect technical terminology failing to exactly represent the technical idea of the present invention, it may need to be understood by being substituted with a technical terminology that can be correctly understood by those skilled in the art to which the present invention pertains. Moreover, a general terminology used by the present invention should be construed as the definition in dictionary or in accordance with the context and should not be construed as an excessively reduced meaning.

A singular representation used in this specification may include a plural representation unless apparently different in the context of usage. In the present application, such a terminology as 'configure', 'include' and the like should not be construed as necessarily including several components or steps, as not including some of the several components or steps, or as further including additional component(s) or step(s).

A terminology including an ordinal number as $1^{st}$, $2^{d}$ and the like used in this specification may be usable to describe various components. Yet, each of the components should be non-limited by the terminology including the ordinal number. The terminology including the ordinal number is used only to discriminate one component from another. For instance, a $1^{st}$ component may be named a $2^{nd}$ component without departing from the scope of the appended claims and their equivalents. Similarly, a $2^{nd}$ component may be named a $1^{st}$ component for example.

When a prescribed component is mentioned as 'connected to' or 'accessed by' a different component, it may be directly connected to or accessed by the different component. Yet, another different component may exist in-between. On the contrary, when a prescribed component is mentioned as 'directly connected to' or 'directly accessed by' a different component, it is understood that another different component does not exist in-between.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

What is claimed is:

1. A method for transmitting and receiving data by a terminal with a first base station supporting a first radio access technology and a second base station supporting a second radio access technology, in a radio access system supporting a multi-RAT (Radio Access Technology), the method comprising:
   performing an initial network entry process with the first base station;
   performing a multi-RAT capability negotiation process with the first base station to exchange information necessary for an access to the second base station;
   performing an access procedure with the second base station; and
   transmitting and receiving data with both of the first base station and the second base station accessed by the access procedure after performing the access procedure,
   wherein the performing of the multi-RAT capability negotiation process comprises:
      transmitting control information indicating at least one quality of service (QoS) class to the first base station, the at least one QoS class being selected by the terminal from among a plurality of QoS classes defined in accordance with a value of at least one QoS parameter, and
      receiving a message from the first base station, the message indicating that a traffic corresponding to the at least one QoS class is redirected to the second base station, and
   wherein the transmitting and receiving of data includes:
      transmitting and receiving the traffic corresponding to the at least one QoS class with the second base station, and
      transmitting and receiving data other than the traffic corresponding to the at least one QoS class with the first base station.

2. The method of claim 1, wherein the at least one QoS parameter comprises at least one of: a sustained traffic rate per flow, a traffic burst, a reserved traffic rate, and a latency.

3. The method of claim 2, wherein the at least one QoS parameter further comprises an uplink grant scheduling type in case of uplink.

4. The method of claim 1, wherein the at least one QoS class is configured to:

prefer to communicate with the second base station; or communicate with the second base station.

5. The method of claim 1, wherein the at least one QoS class is configured to:
   prefer to communicate with the first base station; or
   communicate with the first base station.

6. The method of claim 1, wherein the plurality of QoS classes are defined based on an inclusion relation of quality of service (QoS) parameters.

7. The method of claim 6, wherein the plurality of QoS classes further comprises at least one class independent of the inclusion relation.

8. The method of claim 1, wherein the plurality of QoS classes are defined independently of the inclusion relation.

9. The method of claim 1, wherein the control information includes a sequence configured to prefer to communicate, or configured to communicate, with the first base station or the second base station between the selected at least one QoS class.

10. A terminal for transmitting and receiving data with a first base station supporting a first radio access technology and a second base station supporting a second radio access technology, in a radio access system supporting multi-RAT (multi-radio access technology), the terminal comprising:
    a radio frequency unit configured to transmit and receiving radio signals; and
    a controller connected to the radio frequency unit and configured to:
       control the radio frequency unit to transmit control information indicating at least one quality of service (QoS) class to the first base station through a multi-RAT capability negotiation process with the first base station, the at least one QoS class being selected by the terminal from among a plurality of QoS classes defined in accordance with a value of at least one QoS parameter;
       control the radio frequency unit to receive a message from the first base station, the message indication that a traffic corresponding to the at least one QoS class is redirected to the second base station;
       control the radio frequency unit to perform an access procedure with the second base station;
       control the radio frequency unit to transmit and receive the traffic corresponding to the at least one QoS class with the second base station after performing the access procedure; and
       control the radio frequency unit to transmit and receive data other than the traffic corresponding to the at least one QoS class with the first base station after performing the access procedure.

11. A method for transmitting and receiving data by a terminal with a first base station supporting a first radio access technology and a second base station supporting a second radio access technology, in a radio access system supporting a multi-RAT (Radio Access Technology), the method comprising:
    performing an initial network entry process with the first base station;
    receiving a broadcast message including first control information from the a first base Station, the first control information indicating that a traffic corresponding to a first multi-RAT flow class from the first base station;
    performing a multi-RAT capability negotiation process with the first base station to exchange information necessary for an access to the second base station;
    performing an access procedure with the second base station; and transmitting and receiving data with both of the first base station and the second base station accessed by the access procedure after performing the access procedure,
wherein the first multi-RAT flow class is defined in accordance with a property of a flow preferring to communicate with the second base station, and
wherein the transmitting and receiving of data comprises:
    transmitting and receiving the traffic corresponding to the first control information with the second base station, and
    transmitting and receiving data other than the traffic corresponding to the first control information with the second base station.

12. The method of claim 11, wherein the performing of the multi-RAT capability negotiation process comprises sending to the first base station a message including second control information indicating at least one second multi-RAT flow class different from the first multi-RAT flow class.

13. The method of claim 12, further comprising transmitting and receiving data corresponding to the second control information with the second base station.

14. A terminal for transmitting and receiving data with a first base station supporting a first radio access technology and a second base station supporting a second radio access technology, in a radio access system supporting a multi-RAT (Radio Access Technology), comprising:
    a radio frequency unit configured to transmit and receive radio signals; and
    a controller connected to the radio frequency unit and configured to:
        control the radio frequency unit to receive a broadcast message including first control information from the first base station, the first control information indicating that a traffic corresponding to a first multi-RAT flow class is redirected to the second base station;
        control the radio frequency unit to perform an access procedure with the second base station;
        control the radio frequency unit to transmit and receive the traffic corresponding to the first control information with the second base station after performing the access procedure; and
        control the radio frequency unit to transmit and receive data other than the traffic corresponding to the first control information with the first base station after performing the access procedure,
    wherein the first multi-RAT flow class is defined in accordance with a property of a flow preferring to communicate with the second base station.

15. The terminal of claim 14, wherein the controller controls the radio frequency unit to send to the first base station a message including second control information indicating at least one second multi-RAT flow class different from the first multi-RAT flow class.

16. The method of claim 1, wherein the at least one QoS class is at least one of:
    class indicating that all traffic can be redirected to the second base station;
    a class indicating that all traffic requiring a best effort service can be redirected to the second base station;
    a class indication that a traffic requiring a minimum non-real time polling service can be redirected to the second base station; and
    a class indication that a traffic requiring a real-time polling service can be redirected to the second base station.

17. The method of claim 11, wherein the first multi-RAT flow class is one of:
    a class indicating that all traffics can bee redirected to the second base station;
    a class indication that a traffic requiring a best effort service can be redirected to the second base station;
    a class indicating that a traffic requiring a minimum non-real time polling service can be redirected to the second base station; and
    a class indicating that a traffic requiring a real-time polling service can be redirected to the second base station.

* * * * *